United States Patent
Saito

[19]

[11] Patent Number: 6,166,745
[45] Date of Patent: *Dec. 26, 2000

[54] GRAPHIC FORM SHAPING APPARATUS AND GRAPHIC FORM SHAPING METHOD

[75] Inventor: Shigeru Saito, Tokyo, Japan

[73] Assignee: NEC Corporation, Tokyo, Japan

[ * ] Notice: This patent is subject to a terminal disclaimer.

[21] Appl. No.: 08/956,467

[22] Filed: Oct. 23, 1997

[30] Foreign Application Priority Data

Oct. 25, 1996 [JP] Japan ..................................... 8-283650

[51] Int. Cl.[7] .............................. G06T 11/20; G06K 9/32
[52] U.S. Cl. ............................................. 345/441; 382/293
[58] Field of Search ..................................... 345/437, 438, 345/440, 441, 442, 443; 382/293, 295

[56] References Cited

U.S. PATENT DOCUMENTS 5,889,892   3/1999   Saito   ....................................... 382/293

*Primary Examiner*—Mark R. Powell
*Assistant Examiner*—Thu Nguyen
*Attorney, Agent, or Firm*—Foley & Lardner

[57] ABSTRACT

The invention provides a graphic form shaping apparatus which shapes, when a graphic form having certain symmetry with respect to a line and surrounded by a curved line is inputted, the input graphic form so as to be symmetrical with respect to a line. Apexes and maximal points and minimal points in horizontal and vertical directions of an input graphic form are determined as characteristic points, and the degree of symmetry with respect to a straight line interconnecting two of the characteristic points is measured. If the degree of symmetry satisfies a criterion determined in advance, then it is determined that the input graphic form is symmetrical with respect to the straight line, and the input graphic form is corrected based on the symmetry with respect of the straight line.

13 Claims, 31 Drawing Sheets

GRAPHIC FORM SHAPING APPARATUS AND GRAPHIC FORM SHAPING METHOD

BACKGROUND OF THE INVENTION

1. Field of the Invention

This invention relates to a graphic form shaping apparatus, and more particularly to a graphic form shaping apparatus which shapes a graphic form having symmetry with respect to a line and surrounded by a curved line.

2. Description of the Related Art

Various apparatus and methods have been proposed which recognize, shape and output a graphic form inputted thereto. Japanese Patent Laid-Open Application No. Showa 62-111369 entitled "Symbol Recognition System", which will be hereinafter referred to suitably as prior art 1, proposes a system which automatically reads a design drawing or a like document and recognizes a graphic symbol appearing on the design drawing.

The system of the prior art 1 is shown in block diagram in FIG. 25. Referring to FIG. 25, the system shown includes a recognition processing section 101, a symbol table 102 and a symmetrical conversion section 103. The recognition processing section 101 includes a symmetrical shape discrimination section 111 and a comparison circuit 112.

Operation of the system of the prior art 1 is described with reference to FIG. 25 and FIG. 26 which is a flow chart illustrating a flow of processing of the system of the prior art 1.

A recognition object image inputted is inputted to the recognition processing section 101. The recognition processing section 101 outputs a recognition result 1a as a result of recognition of the inputted graphic form (steps V1 and V2 of FIG. 26). The symmetrical shape discrimination section 111 discriminates whether or not the recognition result 1a is a symmetrical symbol. This discrimination is performed by referring to the symbol table 102 in which classification of symmetrical and asymmetrical symbols is defined (step V3).

Here, if the symbol is not symmetrical, then the recognition result 1a is determined as a recognition result (step V10).

On the other hand, if it is discriminated that the symbol is symmetrical, the symmetrical conversion section 103 performs symmetrical conversion for the inputted image (step V4).

Then, for the image obtained by the symmetrical conversion, recognition processing is performed again by the recognition processing section 101. As a result, a recognition result 2a is obtained (steps V5 and V6).

Thereafter, the recognition result 1a and the recognition result 2a are compared with each other by the comparison circuit 112. If a coincidence output is obtained, then this is determined as a recognition result, but if a coincidence output is not obtained, then it is determined that discrimination is impossible (steps V7 to V9).

As described above, in the system of the prior art 1, data of a graphic form to be used for recognition are prepared in a symbol table and compared with an inputted image. If the inputted image is discriminated as a symmetrical graphic form, then symmetrical conversion is performed for the image and the images before and after the symmetrical conversion are compared with each other. Then, when it is considered that the two images coincide with each other, a result of the comparison with the symbol table is determined as a result of recognition of the graphic form.

Thus, the system of the prior art 1 is disadvantageous in that, since a graphic form to be discriminated as a symmetrical graphic form must be defined in advance in the symbol table 102, if an undefined symmetrical graphic form is inputted, then it cannot be discriminated as a symmetrical graphic form.

Another system is disclosed in Japanese Patent Laid-Open Application No. Showa 63-261481 entitled "Graphic Form Symmetry Recognition System for Graphic Form Recognition Apparatus", which is hereinafter referred to suitably as prior art 2. The system of the prior art 2 recognizes a drawing such as a drawing of a machine or a drawing of a structure drawn based on a simplified drawing method and supplements, from drawn contents of the drawing, dimensions and so forth which are not described on the drawings.

To this end, the system of the prior art 2 is constructed in such a manner as shown in FIG. 27.

Referring to FIG. 27, the system shown includes a graphic form recognition apparatus 201, symmetry candidate line segment extraction means 202, perpendicular line segment setting means 203, calculation means 204 and drawing information setting means 205.

The graphic form recognition apparatus 201 includes a reading processing section 211, an image data storage section 212, a vector processing section 213, a vector classification processing section 214, a symbol recognition processing section 215, a line segment recognition processing section 216, a character recognition processing section 217 and a recognition result storage section 218.

FIG. 28 illustrates a flow of processing of the system shown in FIG. 27.

Referring to FIGS. 27 and 28, in the graphic form recognition apparatus 201, information of a drawing 200 inputted from the reading processing section 211 is stored into the image data storage section 212. The vector processing section 213 performs polygonal line approximation with the image data stored in the image data storage section 212 to convert the image data into vector data and inputs the vector data to the vector classification processing section 214.

The vector classification processing section 214 classifies the vector data into vector data of marks, line segments and characters and supplies the classified vector data to the symbol recognition processing section 215, line segment recognition processing section 216 and character recognition processing section 217, respectively. The line segment recognition processing section 216 classifies the vector data representative of line segments into shape lines, center lines and so forth and stores the classified vector data into the recognition result storage section 218. The symbol recognition processing section 215 and the character recognition processing section 217 identify marks and characters and store them into the recognition result storage section 218, respectively, together with attributes based on results of the identification (step S1 in FIG. 28).

Thereafter, the symmetry candidate line segment extraction means 202 extracts those center lines with regard to which symmetry may possibly be detected from the recognition result storage section 218 and counts the number of those center lines (step W2). Then, the symmetry candidate line segment extraction means 202 checks whether or not there is a shape line which crosses or is isolated around each of the extracted center lines (step W3). If any center line which crosses a shape line or has isolated shapes on the opposite sides thereof is detected, then the symmetry of the shape line or the isolated shapes is discriminated by the perpendicular line segment setting means 203 and the calculation means 204.

FIG. 29 illustrates a method of discriminating symmetry of a shape line which crosses a center line.

Referring also to FIG. 29, the perpendicular line segment setting means 203 draws a perpendicular L2 to a center line b, for example, from an end point P2 of a vector, and the calculation means 204 calculates the distance 12 between the end point P2 and the center line b. Further, the calculation means 204 calculates the distance m2 between a cross point X2 on a vector c which crosses an extension line of the perpendicular L2 and the center line b. Then, the calculation means 204 calculates the difference between the two distances 12 and m2, and if the difference satisfies $$|l2-m2|<\Delta 1/2 \qquad (1)$$

with respect to a fixed threshold value ($\Delta 1/2$), then the calculation means 204 performs similar calculation also for the other end points.

Then, if the expression (1) above is satisfied by all end points and the sum total of the differences in distance satisfies $$\Sigma|ln-mn|<mn \qquad (2)$$

with respect to a fixed threshold value Q, it is determined that the shape line is symmetrical with respect to the center line b.

After symmetry discrimination is performed for all center lines, the drawing information setting means 205 sets omitted drawing information based on part of drawing information described on shape lines having symmetry (step W7).

As described above, in the system of the prior art 2, a center line which is drawn in advance on a drawing to be inputted is used as an axis of symmetry.

Thus, the system of the prior art 2 is disadvantageous in that, since only a center line which is described in a line type which signifies a center line in advance is recognized as an axis of symmetry, a center line must be described on a graphic form to be inputted.

SUMMARY OF THE INVENTION

It is an object of the present invention to provide a graphic form shaping apparatus which shapes, when it receives a graphic form which has some symmetry with respect to a line and is surrounded by a curved line as an input graphic form, the input graphic form so as to be symmetrical with respect to a single axis of symmetry.

It is another object of the present invention to provide a graphic form shaping apparatus which shapes an input graphic form which has some symmetry with respect to a line and is surrounded by a curved line so as to be symmetrical with respect to two orthogonal axes of symmetry.

It is a further object of the present invention to provide a graphic form shaping apparatus which automatically extracts, from a curved line graphic form drawn while an axis of symmetry is not taken into consideration, a single or a pair of orthogonal axes of symmetry and shapes the curved line graphic form so that it may be symmetrical with respect to the extracted axis or axes of symmetry.

It is a still further object of the present invention to provide a graphic form shaping apparatus which rapidly abandons a candidate for an axis of symmetry which does not have symmetry to achieve a comparatively high processing speed.

It is a yet further object of the present invention to provide a graphic form shaping apparatus which can select, where a plurality of candidates for an axis of symmetry which are suitable as an axis of symmetry of an input graphic form, an axis of symmetry which is used upon shaping.

It is a yet further object of the present invention to provide a graphic form shaping apparatus which forms a line symmetrical graphic form conforming to an intention of a user of the apparatus when the user indicates an element which refers to the position of an input coordinate point or an axis of symmetry upon symmetrical shaping processing.

It is a yet further object of the present invention to provide a graphic form shaping apparatus which shapes, when an input graphic form has symmetry with respect to either one of two orthogonal candidates for an axis of symmetry, the input graphic form with respect to the one candidate for an axis of symmetry.

In order to attain the objects described above, according to the present invention, there is provided a graphic form shaping apparatus for shaping a graphic form surrounded by a curved line, comprising inputting means for inputting an input graphic form, characteristic point calculation means for calculating characteristic points including apexes and maximal points and minimal points in horizontal and vertical directions of the input graphic form, curved line approximation means for calculating representative points representative of curved lines of the input graphic form between the characteristic points and approximating the curved lines with approximate curved lines between the characteristic points and the representative points, symmetry axis candidate calculation means for calculating symmetry axis candidates which are straight lines each interconnecting two opposing ones of the characteristic points, discrimination symmetry axis determination means for selecting, from among the symmetry axis candidates, a symmetry axis candidate with which symmetry is to be discriminated, symmetry discrimination line segment calculation means for calculating symmetry discrimination line segments which are line segments each interconnecting two opposing ones of the characteristic points and the representative points with respect to the symmetry axis candidate selected by the discrimination symmetry axis determination means, symmetry axis distance calculation means for calculating symmetry axis distances which are distances between middle points of the symmetry discrimination line segments and the symmetry axis candidate, symmetry axis angle calculation means for calculating symmetry axis angles which are magnitudes of differences between angles defined by the symmetry discrimination line segments and the symmetry axis candidate and 90 degrees, symmetry discrimination means for comparing a set of statistic values of the symmetry axis distances and the symmetry axis angles with respect to the symmetry axis candidate with criteria set in advance to discriminate whether or not the input graphic form is symmetric with respect to the symmetry axis candidate to discriminate whether or not the symmetry axis candidate is a symmetry axis, symmetrical shaping processing means for moving the characteristic points and the representative points based on the symmetry with respect to the symmetry axis, storage means for storing the moved characteristic points and representative points, and outputting means for outputting the moved characteristic points and representative points.

In the graphic form shaping apparatus, a statistic of values of distances between a symmetry axis candidate extracted by the symmetry axis candidate calculation means from an input graphic form after curved line approximated by the curved line approximation means and middle points of symmetry discrimination line segments produced by the first symmetry discrimination line segment calculation means and another statistic of values of differences between angles defined by the symmetry discrimination line segments and the symmetry axis candidate are calculated to discriminate symmetry of the input graphic form with respect to the symmetry axis candidate. Then, if the input graphic form has line symmetry, then the input graphic form is shaped so that the input graphic form may be line symmetrical with respect to the symmetry axis candidate.

Consequently, the graphic form shaping apparatus is advantageous in that it can automatically extract a horizontal or vertical straight line symmetry axis from a curved line graphic form inputted by a user and obtain a graphic form shaped so as to be symmetrical with respect to the symmetry axis.

Preferably, the graphic form shaping apparatus further comprises discrimination line segment appropriateness discrimination means for comparing the symmetry axis distance and the symmetry axis angle with regard to one of the symmetry discrimination line segments with criteria determined in advance and discriminating that the symmetry axis candidate is not a symmetry axis when the symmetry axis distance and the symmetry axis angle do not satisfy the criteria.

Where the discrimination line segment appropriateness discrimination means is provided additionally, it discriminates symmetry with respect to a symmetry axis candidate for each symmetry discrimination line segment. Then, if it is discriminated that the symmetry discrimination line segment does not have symmetry with resepct to the symmetry axis candidate, then it is determined that the symmetry axis candidate is not a symmetry axis candidate appropriate for the input graphic form. Consequently, the graphic form shaping apparatus is advantageous in that, since a symmetry axis candidate with respect to which an input graphic form has no symmetry can be abandoned comparatively quickly, comparatively high speed operation can be achieved.

Preferably, the graphic form shaping apparatus further comprises shaping symmetry axis determination means for determining, when both of vertical and horizontal symmetry axis candidates are symmetry axes, the symmetry axis to be used by the symmetrical shaping processing means.

Where the shaping symmetry axis determination means is provided additionally, if a plurality of candidate axis candidates are appropriate as symmetry axes of an input graphic form, then a symmetry axis to be used for shaping processing can be determined by the shaping symmetry axis determination means. Consequently, the graphic form shaping apparatus can select, where a plurality of candidate axis candidates are appropriate as symmetry axes of an input graphic form, a symmetry axis to be used for shaping processing.

The shaping symmetry axis determination means may be constructed such that it compares sets of statistic values of the symmetry axis distances and the symmetry axis angles of the symmetry axes with each other and determines one of the symmetry axes which exhibits the highest symmetry as the symmetry axis to be used by the symmetrical shaping processing means.

Where a plurality of candidate axis candidates are appropriate as symmetry axes of an input graphic form, the shaping symmetry axis determination means performs shaping processing using a symmetry axis candidate having a comparatively high degree of symmetry, and this decreases the difference between the input graphic form and the shaped graphic form. Consequently, where a plurality of candidate axis candidates are appropriate as symmetry axes of an input graphic form, a shaping result having a shape very near to the input graphic form can be obtained.

Preferably, the graphic form shaping apparatus further comprises shaping reference indication means for allowing a user of the graphic form shaping apparatus to refer to and indicate a reference point for determination of positions of the symmetry axes and the characteristic points and representative points.

Where the shaping reference indication means is provided additionally, upon symmetrical shaping processing, a user of the graphic form shaping apparatus can use the shaping reference indication means to indicate the position of a symmetry axis to be used for line symmetrical shaping or a factor to be referred to in connection with a coordinate point to be corrected. Consequently, a line symmetrical graphic form which conforms better to an intention of the user can be inputted.

Preferably, the discrimination symmetry axis determination means selects, from among the symmetry axis candidates calculated by the symmetry axis candidate calculation means, a vertical symmetry axis candidate which is that one of the symmetry axis candidates which is most vertical with respect to a reference horizontal line determined in advance and a horizontal symmetry axis candidate which is that one of the symmetry axis candidates which is most horizontal with respect to the reference horizontal line. In this instance, preferably the graphic form shaping apparatus further comprises orthogonal symmetry axis discrimination means for comparing an angle defined by the vertical symmetry axis candidate and the horizontal symmetry axis candidate with a reference value determined in advance to discriminate whether or not the vertical symmetry axis candidate and the horizontal symmetry axis candidate extend perpendicularly to each other, the symmetrical shaping processing means being formed as orthogonal axis symmetrical shaping processing means which corrects the symmetry axes so that that one of the symmetry axes which is one of the vertical symmetry axis candidates may be vertical with respect to the horizontal line and that one of the symmetry axes which is one of the horizontal symmetry axis candidates may be horizontal with respect to the horizontal line and moves the characteristic points and the representative points based on the symmetry with respect to both of the symmetry axes.

In the graphic form shaping apparatus just described, where a pair of selected symmetry axis candidates extend perpendicularly to each other, symmetry of an input graphic form with respect to each of the symmetry axis candidates is discriminated. Then, if it is discriminated that the input graphic form is symmetrical with respect to both of the symmetry axis candidates, then the input graphic form is so shaped that it may be line symmetrical with respect to both of the orthogonal symmetry axis candidates. Consequently, the graphic form shaping apparatus can automatically extract two horizontal and vertical straight line orthogonal symmetry axes from a curved line graphic form inputted by a user and obtain a graphic form shaped in a line symmetrical relationship with respect to both of the orthogonal symmetry axes.

In this instance, preferably the graphic form shaping apparatus further comprises one axis symmetrical shaping processing means for correcting either one of the symmetry axes which are ones of the vertical symmetry axis candidates and the horizontal symmetry axis candidates with respect to the horizontal line and moving the characteristic points and the representative points based on the symmetry with respect to the one symmetry axis.

Where the one axis symmetrical shaping means is provided additionally, even if an input graphic form does not have symmetry with respect to both of orthogonal axes, if it has symmetry with respect to either one of the symmetry axes, then the one axis symmetrical shaping means shapes the input graphic form so that the graphic form may be symmetrical with respect to the symmetry axis. Consequently, the graphic form shaping apparatus can shape an input graphic form, which does not have symmetry with respect to both of orthogonal axes, with respect to one symmetry axis candidate.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

1. First Embodiment 1-1. Construction

Figure 1:
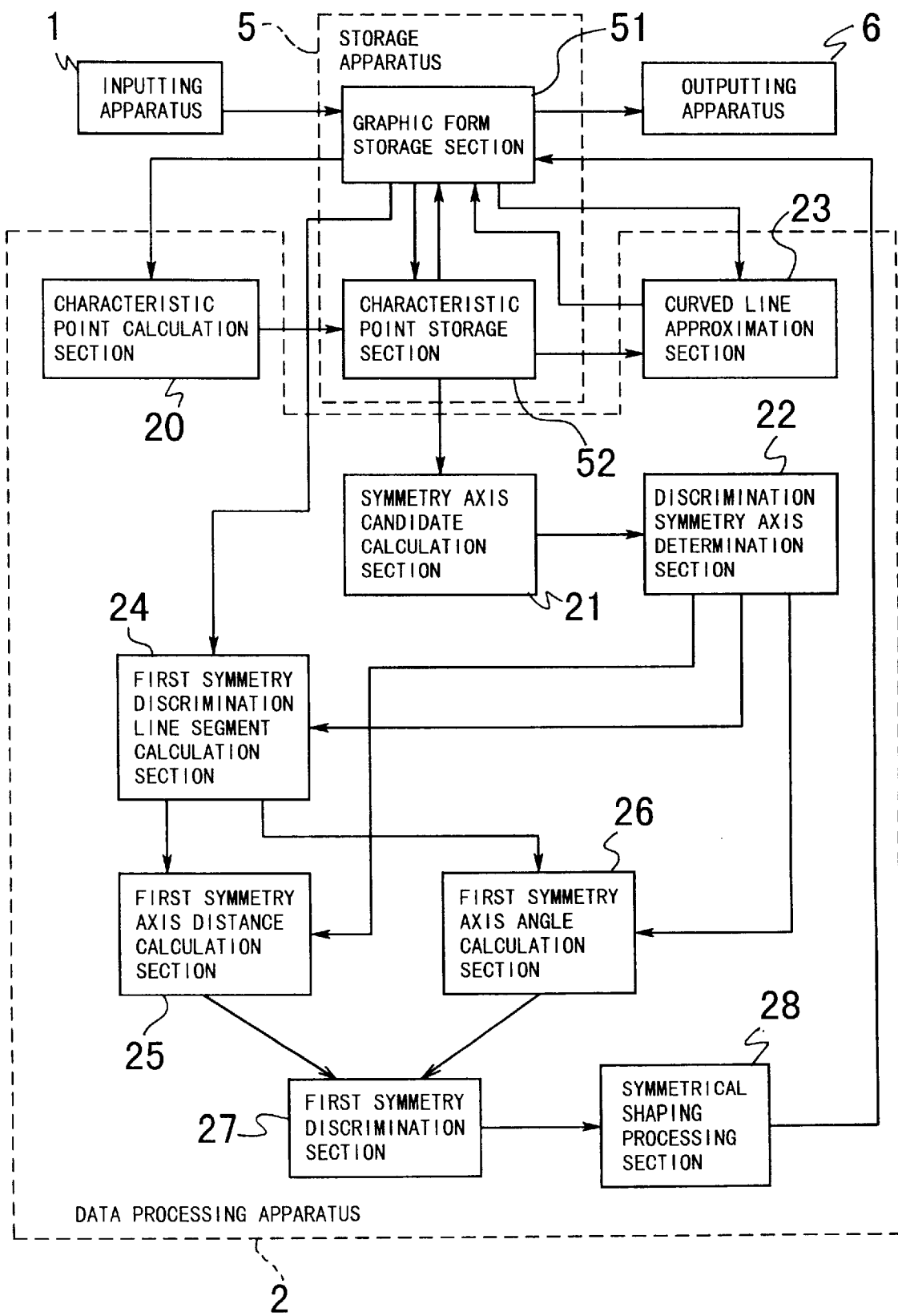
FIG. 1 is a block diagram of a graphic form shaping apparatus to which the present invention is applied.
Figure 2:
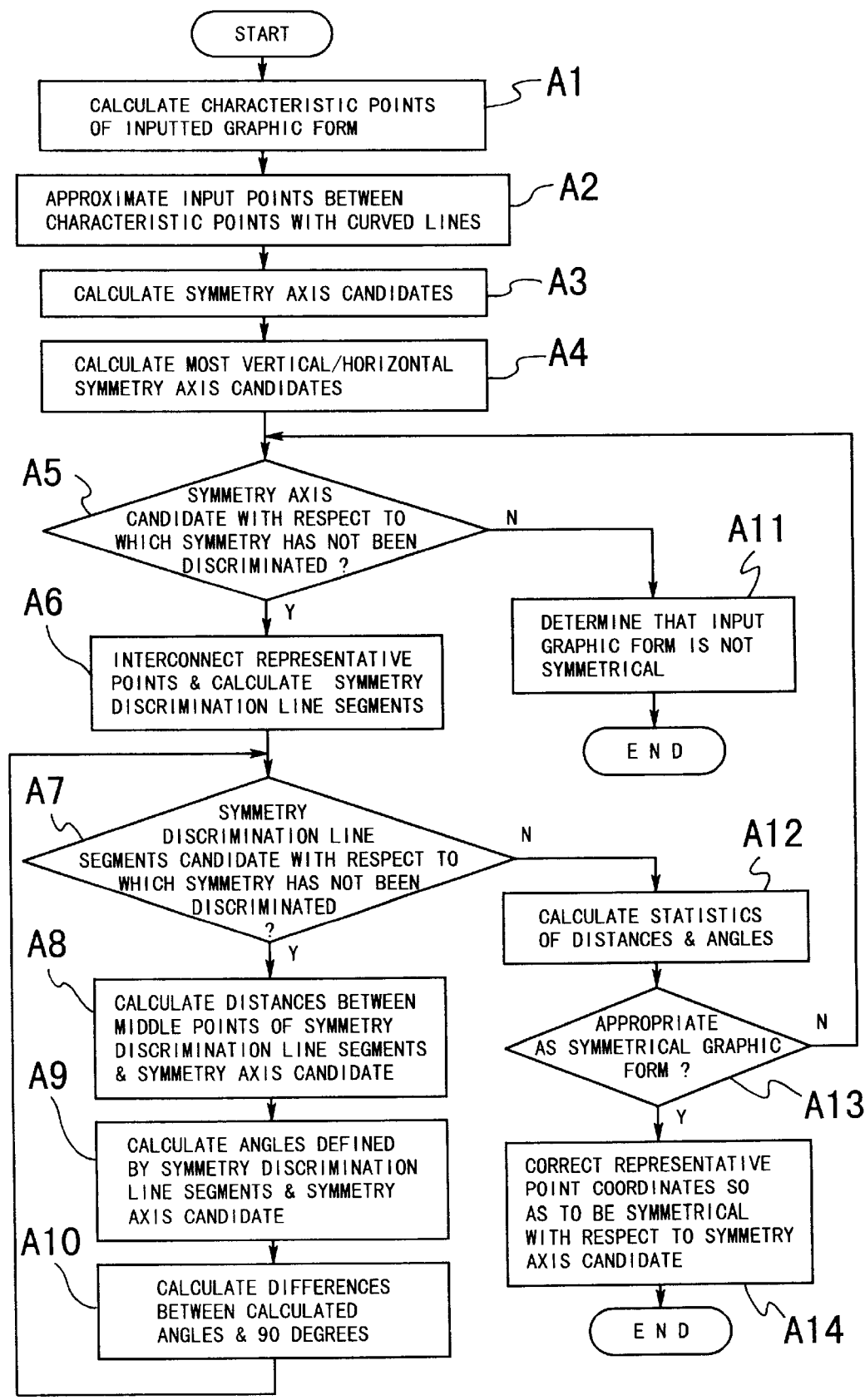
FIG. 2 is a flow chart illustrating a processing procedure of the graphic form shaping apparatus shown in FIG. 1.

FIG. 1 shows a graphic form shaping apparatus to which the present invention is applied. Referring to FIG. 1, the graphic form shaping apparatus shown includes an inputting apparatus 1 for inputting a graphic form using a keyboard, a mouse, a pen or the like, a data processing apparatus 2 which operates by program control, a storage apparatus 5 for storing graphic form information, characteristic points and so forth, and an outputting apparatus 6 such as a display unit or a printer.

The data processing apparatus 2 includes a characteristic point calculation section 20, a symmetry axis candidate calculation section 21, a discrimination symmetry axis determination section 22, a curved line approximation section 23, a first symmetry discrimination line segment calculation section 24, a first symmetry axis distance calculation section 25, a first symmetry axis angle calculation section 26, a first symmetry discrimination section 27 and a symmetrical shaping processing section 28.

The storage apparatus 5 includes a graphic form storage section 51 and a characteristic point storage section 52.

A detailed construction of the data processing apparatus 2 is described below.

A graphic form inputted from the inputting apparatus 1 is stored as a train of coordinate points which trace a locus of a curved line into the graphic form storage section 51.

The characteristic point calculation section 20 calculates coordinates of apexes and maximal points and minimal points in a horizontal direction and a vertical direction from the input coordinate point train stored in the graphic form storage section 51 and stores the calculated values as characteristic points of the input graphic form into the characteristic point storage section 52.

The graphic form stored in the graphic form storage section 51 and the characteristic points stored in the characteristic point storage section 52 are coordinated with each other.

The curved line approximation section 23 performs curved line approximation of the coordinate point train of the input graphic form between the characteristic points with approximate curved lines to calculate representative points which are points representative of the approximate curved lines.

The calculated representative points are stored into the graphic form storage section 51 together with the characteristic points stored in the characteristic point storage section 52.

The symmetry axis candidate calculation section 21 calculates symmetry axis candidates to be used for symmetry discrimination from among the characteristic points stored in the characteristic point storage section 52.

The discrimination symmetry axis determination section 22 extracts one most horizontal symmetry axis candidate and one most vertical symmetry axis candidate from among all of the symmetry axis candidates calculated by the symmetry axis candidate calculation section 21.

The first symmetry discrimination line segment calculation section 24 traces the characteristic points and the representative points from that one of the characteristic points through which one of the two symmetry axis candidates thus extracted passes toward the other characteristic point to calculate pairs of the characteristic points and the representative points to be used as pairs for discrimination of symmetry of the input graphic form and interconnects the pairs of the characteristic points and the representative points with straight lines to form symmetry discrimination line segments.

The first symmetry axis distance calculation section 25 calculates the distance between a middle point of each of the symmetry discrimination line segments and the symmetry axis candidate.

The first symmetry axis angle calculation section 26 calculates the angle defined by each of the symmetry discrimination line segments and the symmetry axis candidate and calculates a difference between the angle and 90 degrees.

The first symmetry discrimination section 27 calculates a statistic of the values of the distances between the middle points of all of the symmetry discrimination line segments and the symmetry axis candidate calculated by the first symmetry axis distance calculation section 25 and a statistic of the differences between the angles defined by all of the symmetry discrimination line segments and the symmetry axis candidate and 90 degrees calculated by the first symmetry axis angle calculation section 26 to discriminate line symmetry of the input graphic form.

The symmetrical shaping processing section 28 changes the coordinates of the pairs of the characteristic points and the representative points of the input graphic form, which has been determined by the first symmetry discrimination section 27 that it has symmetry with respect to a line, so that the input graphic form may become a graphic form symmetrical with respect to the symmetry axis candidate. The thus produced graphic form is stored into the graphic form storage section 51 and outputted as an approximate curved line to the outputting apparatus 6.

1-2. Operation

Operation of the graphic form shaping apparatus is described below with reference to FIGS. 1 to 9.

A graphic form inputted from the inputting apparatus 1 is stored as an input coordinate point train, which traces a locus of a curved line, into the graphic form storage section 51. The characteristic point calculation section 20 calculates coordinates of apexes and maximal points and minimal points in a horizontal direction and a vertical direction from the input coordinate point train and stores resulting values as characteristic points of the input graphic form into the characteristic point storage section 52. Further, the input graphic form is outputted to the outputting apparatus 6 (step A1 of FIG. 2).

Figure 5:
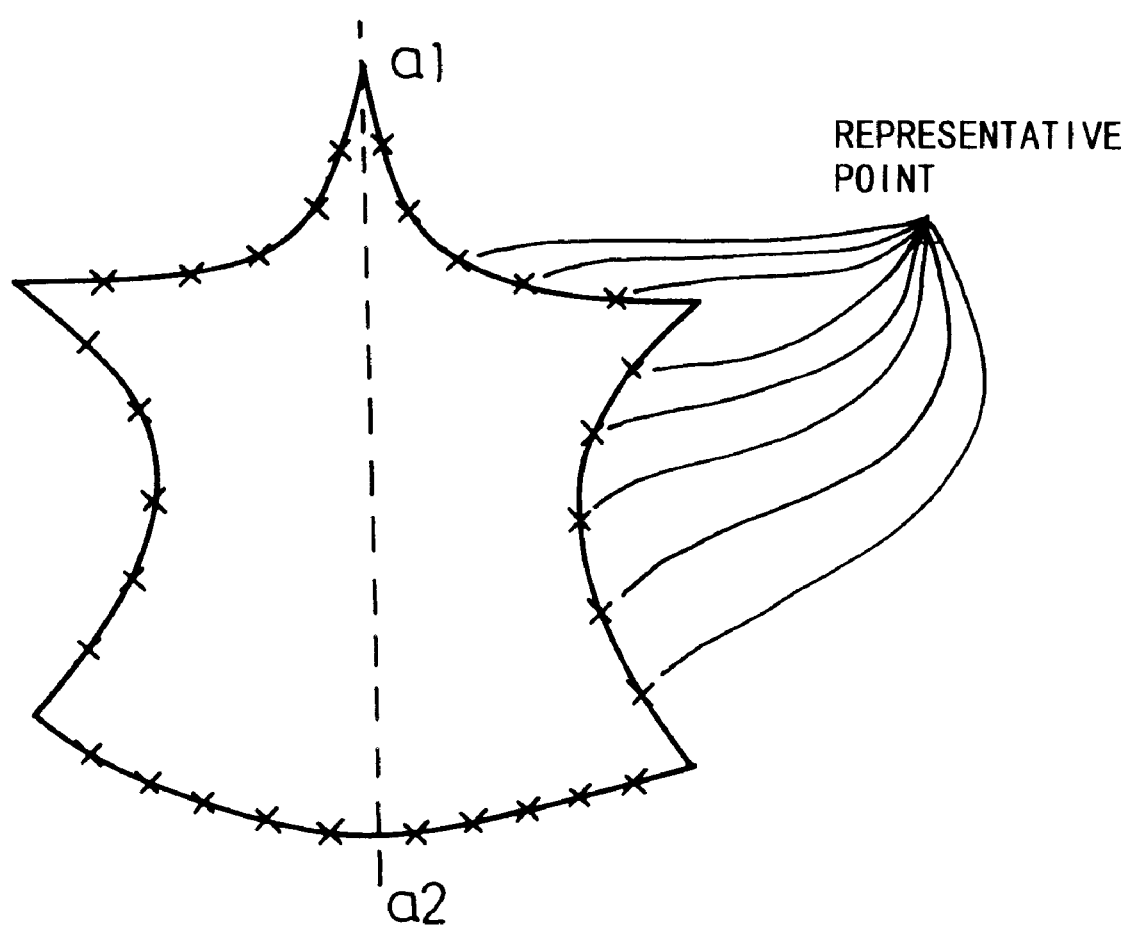
FIG. 5 is a diagrammatic view showing an example of representative points calculated by a curved line approximation section of the graphic form shaping apparatus shown in FIG. 1.

Then, the curved line approximation section 23 performs curved line approximation with a spline curve or a Bezier curve using input coordinate points between the characteristic points calculated by the characteristic point calculation section 20. In this instance, the numbers of such representative points between the individual characteristic points are equal to each other. The representative points are stored into the graphic form storage section 51 together with the characteristic points (FIG. 5, step A2).

Figure 3:
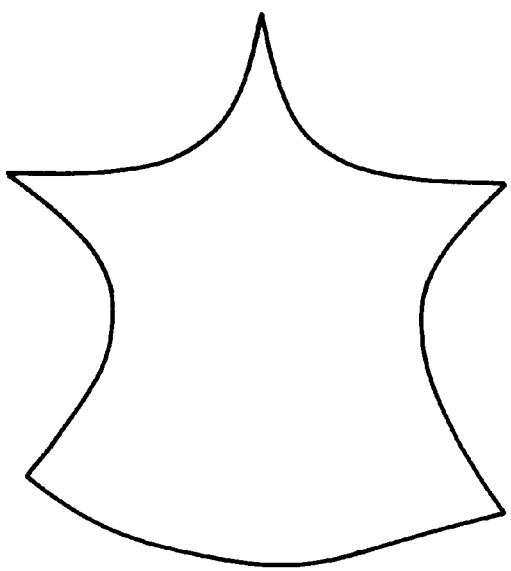
FIGS. 3(1) and 3(2) are diagrammatic views showing an example of an input graphic form and a graphic form, respectively, obtained by shaping the input graphic form by the graphic form shaping apparatus shown in FIG. 1.
Figure 3:
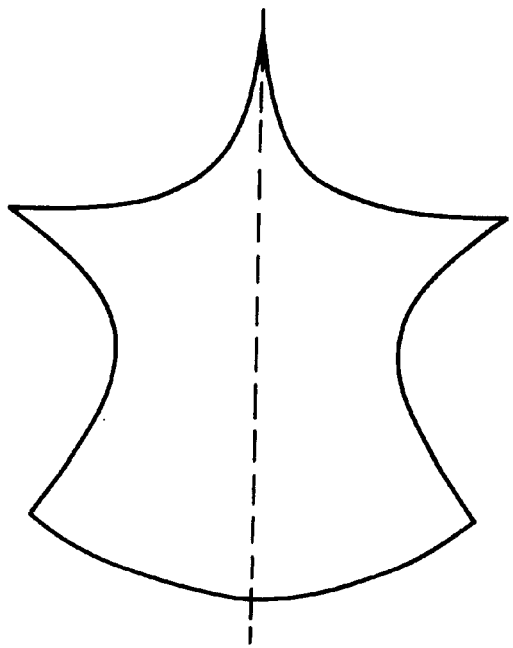
Figure 6:
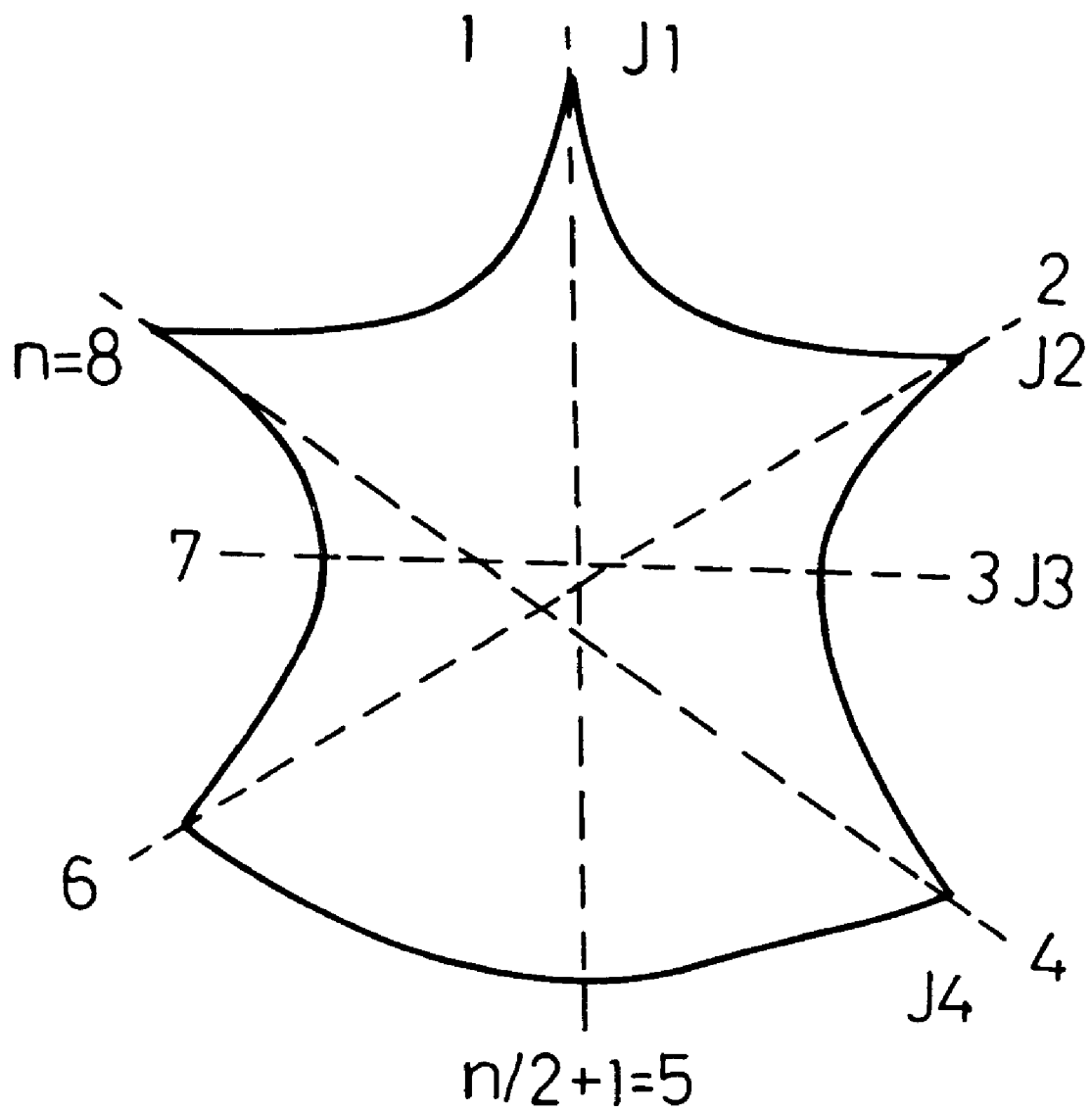
FIG. 6 is a diagrammatic view showing an example of candidates for an axis of symmetry calculated by a symmetry axis candidate calculation section of the graphic form shaping apparatus shown in FIG. 1.

Thereafter, the symmetry axis candidate calculation section 21 refers to the characteristic points stored in the characteristic point storage section 52 to combine, where the input graphic form has n characteristic points, each mth and n/2+mth (m=1, 2, . . . ) characteristic points and determines the individual pairs as symmetry axis candidates (step A3). For example, from such an input graphic form as shown in FIGS. 3(1) and 3(2), four symmetry axis candidates shown in FIG. 6 are calculated.

Figure 7:
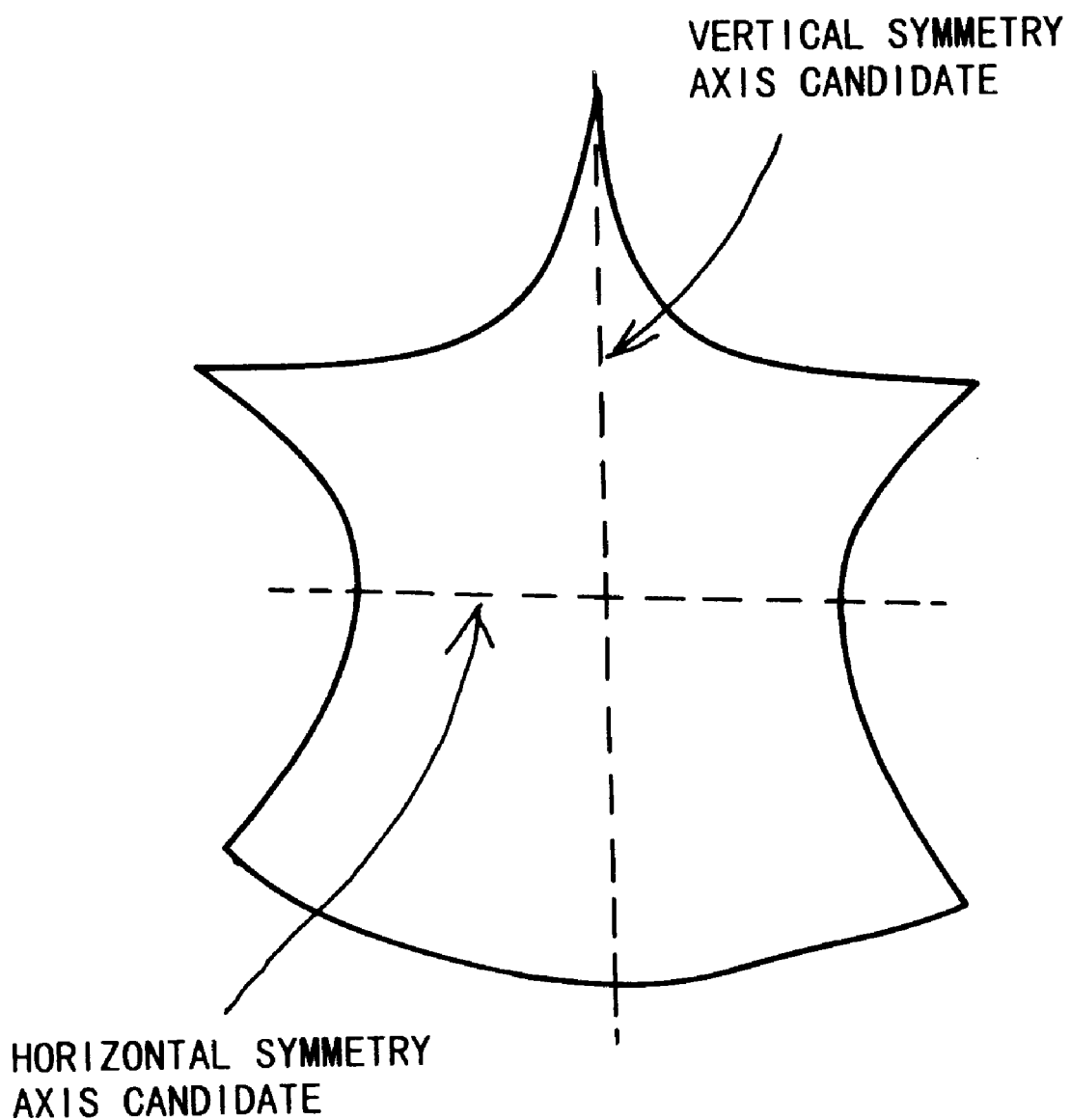
FIG. 7 is a diagrammatic view showing an example of a horizontal symmetry axis candidate and a vertical symmetry axis candidate extracted from among the symmetry axis candidates shown in FIG. 6 by a discrimination symmetry axis determination section of the graphic form shaping apparatus shown in FIG. 1.

Then, the discrimination symmetry axis determination section 22 extracts a most horizontal symmetry axis candidate and a most vertical symmetry axis candidate from among all of the symmetry axis candidates calculated by the symmetry axis candidate calculation section 21 (FIG. 7, step A4).

The following processing is performed for one of the thus extracted symmetry axis candidates.

Figure 8:
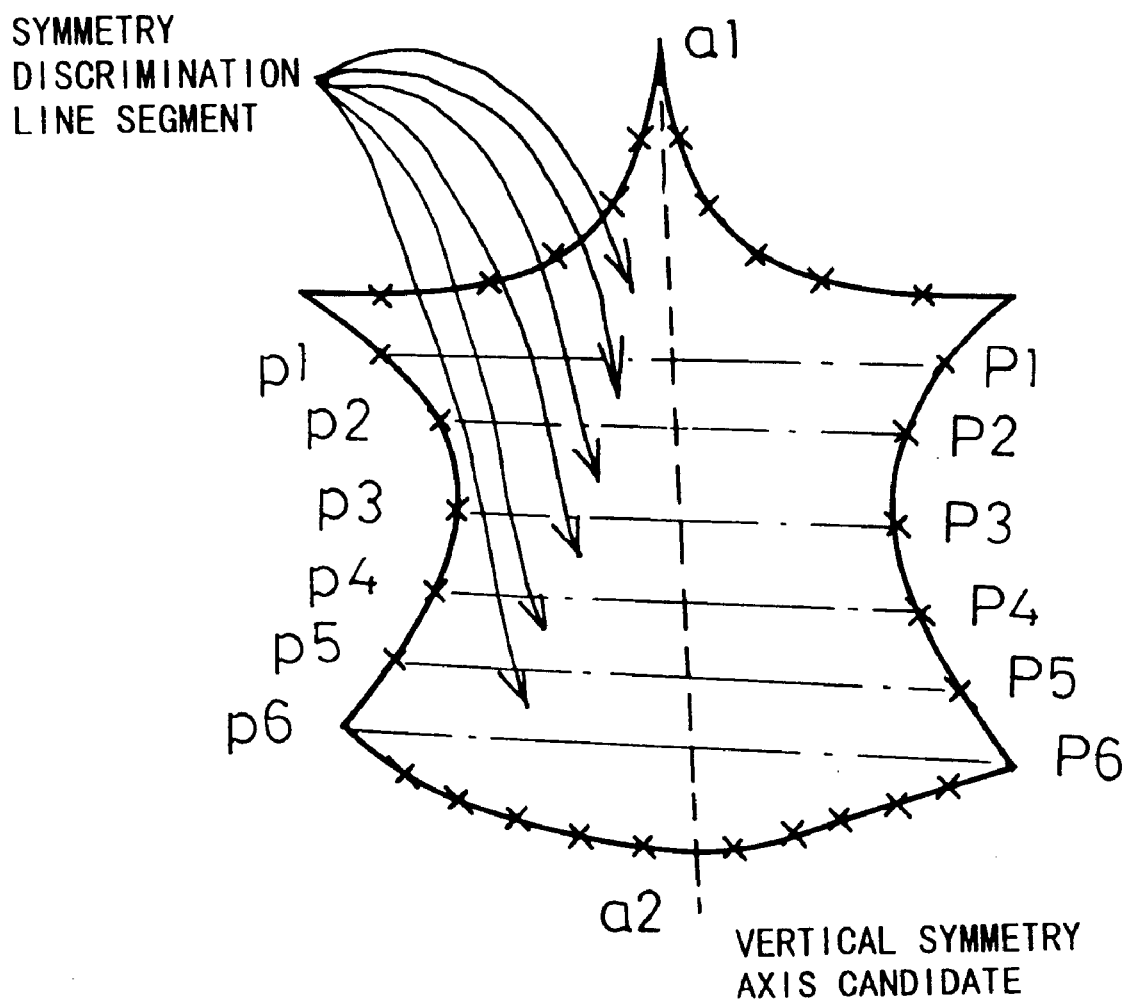
FIG. 8 is a diagrammatic view showing an example of symmetry discrimination line segments calculated from the characteristic points and the representative points shown in FIGS. 4 and 5, respectively.
Figure 9:
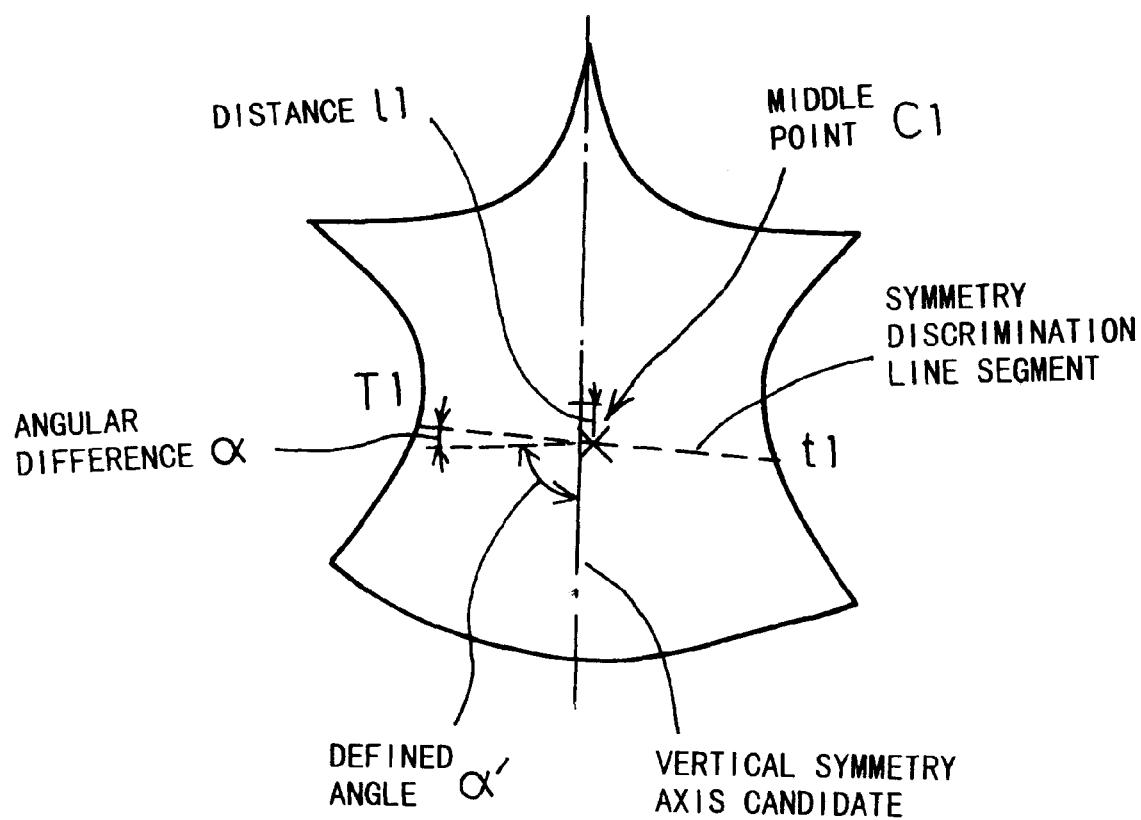
FIG. 9 is a diagrammatic view illustrating an example of a method of discriminating symmetry using symmetry discrimination line segments.

First, the first symmetry discrimination line segment calculation section 24 traces the characteristic points and the representative points on the opposite sides of the symmetry axis candidate from one to the other of the characteristic points through which the symmetry axis candidate passes. In this instance, a representative point reached first in the clockwise tracing and another representative point reached first in the counterclockwise tracing after the tracings are started from the one characteristic point through which the symmetry axis candidate passes are interconnected by a line. Similarly, representative points reached second, third, . . . in the clockwise tracing and representative points reached second, third, . . . in the counterclockwise tracing, and characteristic points reached first, second, . . . in the clockwise tracing and characteristic points reached first, second, . . . in the counterclockwise tracing, are successively interconnected by lines, respectively, until the tracings come to the other characteristic point. The line segments between the representative points and the characteristic points are referred to as symmetry discrimination line segments (FIG. 8, step A6).

Thereafter, the first symmetry axis distance calculation section 25 calculates coordinates of the middle points of the symmetry discrimination line segments and then calculates distances between the thus calculated middle points and the symmetry axis candidate (step A8). Meanwhile, the first symmetry axis angle calculation section 26 calculates angles defined by the symmetry discrimination line segments and the symmetry axis candidate and calculates differences (absolute values) between the thus calculated angles and 90 degrees (steps A9 and A10).

After the processing in steps A8 to A10 is performed for all of the symmetry discrimination line segments (step A7), the first symmetry discrimination section 27 calculates statistic conditions of the distances and the angular differences thus calculated. For the statistic conditions, for example, a mean or a variance may be used (step A12).

Where the calculated statistic conditions fall within certain fixed ranges provided by threshold values (where a mean or a variance is employed, a value nearer to 0 has a higher degree of symmetry), the symmetry axis candidate is appropriate as a symmetry axis of the input graphic form. In other words, it is determined that the input graphic form is symmetrical with respect to the symmetry axis candidate (step A13).

If it is determined by the first symmetry discrimination section 27 that the input graphic form is symmetrical with respect to a line, then the symmetrical shaping processing section 28 first corrects the symmetry axis candidate to a vertical or horizontal symmetry axis candidate. Then, the symmetrical shaping processing section 28 performs correction of the coordinates of the characteristic points and the representative points so that the pairs of the characteristic points and the representative points calculated by the first symmetry discrimination line segment calculation section 24 and forming the individual symmetry discrimination line segments may individually be symmetrical with respect to the corrected symmetry axis. Then, the symmetrical shaping processing section 28 stores the corrected coordinates into the graphic form storage section 51. The thus shaped graphic form is outputted as an approximate curved line to the outputting apparatus 6 (step A14).

If it is not determined that the input graphic form is symmetrical with respect to the symmetry axis candidate, then the processing in steps A6 to A13 is repeated for the other symmetry axis candidate. If it is determined that the input graphic form is not symmetrical with respect to any of the two symmetry axis candidates, then it is determined that the inputted graphic form is not symmetrical with respect to any line.

1-3. Example of Operation

A detailed example of operation of the graphic form shaping apparatus is described below.

Figure 4:
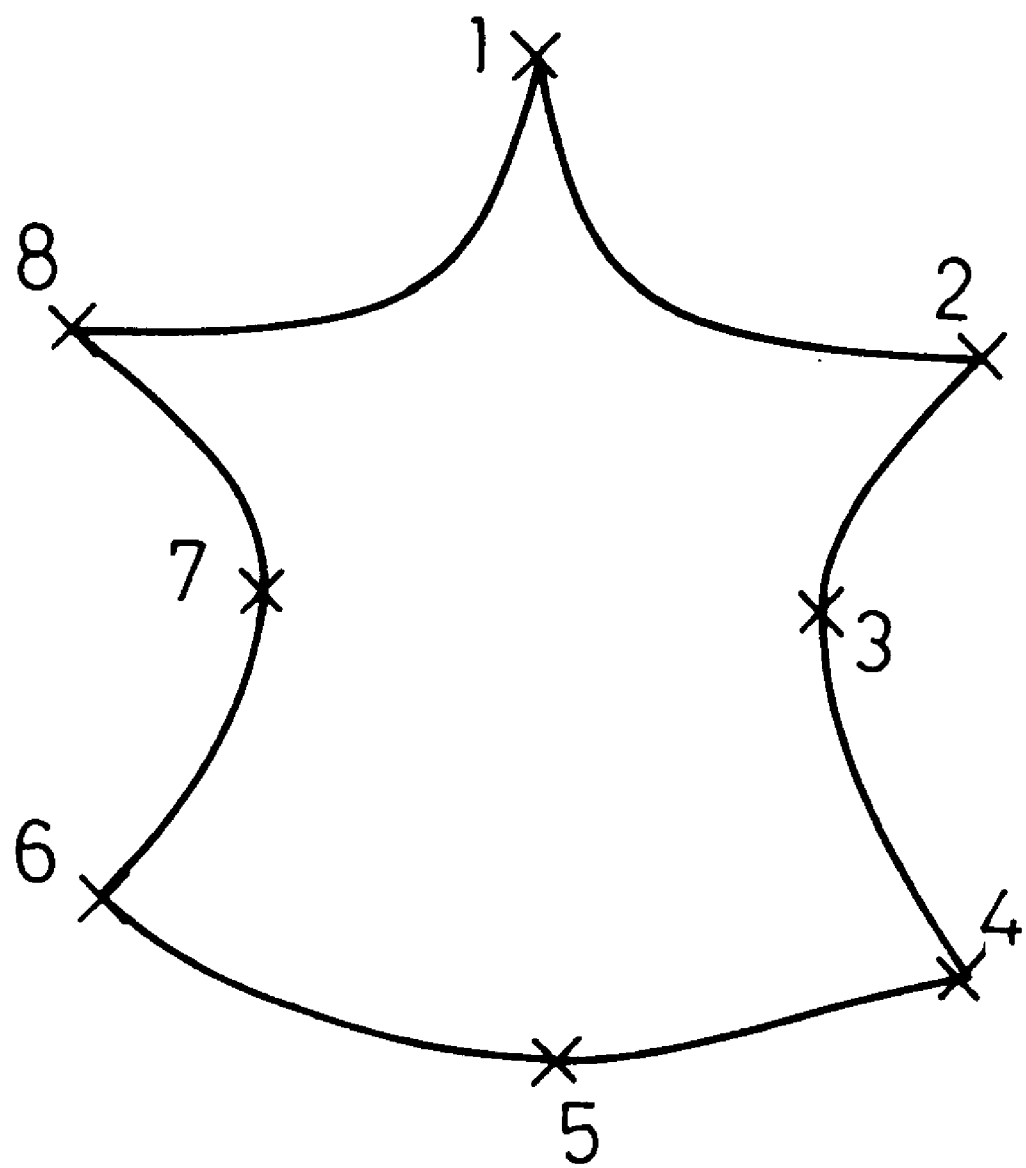
FIG. 4 is a diagrammatic view showing an example of characteristic points calculated by a characteristic point calculation section of the graphic form shaping apparatus shown in FIG. 1.

For example, such a graphic form as shown in FIG. 3(1) inputted from the inputting apparatus 1 is stored as an input coordinate point train into the graphic form storage section 51. The characteristic point calculation section 20 calculates coordinates of apexes and maximal points and minimal points in a horizontal direction and a vertical direction of the input graphic form and stores resulting values into the characteristic point storage section 52. In the present example, eight characteristic points are calculated as seen in FIG. 4. Further, the inputted graphic form is outputted to the outputting apparatus 6.

Then, the curved line approximation section 23 performs curved line approximation with a spline curve or a Bezier curve using the input coordinate points between the characteristic points calculated by the characteristic point calculation section 20. In this instance, the numbers of such representative points between the individual characteristic points are selected so as to be equal to each other. The representative points are stored into the graphic form storage section 51 together with the characteristic points. In the example shown in FIG. 5, five representative points are produced between each two adjacent characteristic points.

Thereafter, the symmetry axis candidate calculation section 21 produces straight lines interconnecting each mth and n/2+mth (n=number of the characteristic points, m=1, 2, . . . ) ones of the characteristic points calculated by the characteristic point calculation section 20 and determines the individual straight lines as symmetry axis candidates. In the present example, four symmetry axis candidates J1 to J4 are calculated as seen in FIG. 6.

Then, the discrimination symmetry axis determination section 22 extracts a most horizontal symmetry axis candidate J3 and a most vertical symmetry axis candidate J1 from among the four symmetry axis candidates calculated by the symmetry axis candidate calculation section 21 (FIG. 7).

First, if the symmetry axis candidate J1 is selected as a symmetry axis candidate for which symmetry discrimination is to be performed, then the first symmetry discrimination line segment calculation section 24 successively traces the characteristic points and the representative points on the opposite sides of the symmetry axis candidate J1 from a characteristic point a1 to the other characteristic point a2 through which the symmetry axis candidate J1 passes. In this instance, those characteristics and representative points traced by the same numbers of tracing movements or strokes are successively interconnected by straight lines, and the interconnecting line segments are determined as symmetry discrimination line segments. In FIG. 8, the line segments are denoted by P1p1, P2p2, . . . The processing described above is performed for all of the characteristic points and the representative points.

Thereafter, the first symmetry axis distance calculation section 25 calculates distances between the middle points of all of the symmetry discrimination line segments and the symmetry axis candidate J1. For example, for the symmetry discrimination line segment T1t1 shown in FIG. 9, coordinates of the middle point C1 of it are calculated, and the distance l1=3 from the symmetry axis candidate J1 is calculated. Then, the first symmetry axis angle calculation section 26 calculates angles α' defined by all of the symmetry discrimination line segments and the symmetry axis candidate J1 and calculates differences α (absolute values) between the thus calculated angles α' and 90 degrees.

Thereafter, the first symmetry discrimination section 27 calculates statistic conditions of the distances calculated by the first symmetry axis distance calculation section 25 and the angular differences calculated by the first symmetry axis angle calculation section 26. Where means are calculated as the statistic conditions, if the mean values calculated fall within fixed ranges, for example, if the mean values of the distances and the angular differences are smaller than 5, then the first symmetry discrimination section 27 determines that the input graphic form is symmetrical with respect to the symmetry axis candidate J1. If the calculated means are 2.5 and 3.5, then it is determined that the input graphic form shown in FIG. 3(1) is symmetrical with respect to the symmetry axis candidate J1.

Thereafter, the symmetrical shaping processing section 28 first corrects the symmetry axis candidate J1 to a vertical symmetry axis.

Then, the symmetrical shaping processing section 28 performs correction of the coordinates of the characteristic points and the representative points so that the pairs of the characteristic points and the representative points forming the individual symmetry discrimination line segments calculated by the first symmetry discrimination line segment calculation section 24 may individually be symmetrical with respect to the corrected symmetry axis. Then, the symmetrical shaping processing section 28 stores the corrected coordinates into the graphic form storage section 51. In this instance, such a graphic form as shown in FIG. 3(2) is produced as an approximate curved line.

The graphic form shown in FIG. 3(1) is erased from the outputting apparatus 6, and the graphic form shown in FIG. 3(2) is outputted by the outputting apparatus 6.

With the graphic form shaping apparatus of the embodiment described above, it is possible to automatically extract a symmetry axis from a curved line graphic form inputted by a user and having a horizontal or vertical symmetry axis and shape the curved line graphic form into a graphic form symmetrical with respect to the symmetry axis.

2. Second Embodiment

Another graphic form shaping apparatus to which the present invention is applied is described below.

2-1. Construction

Figure 10:
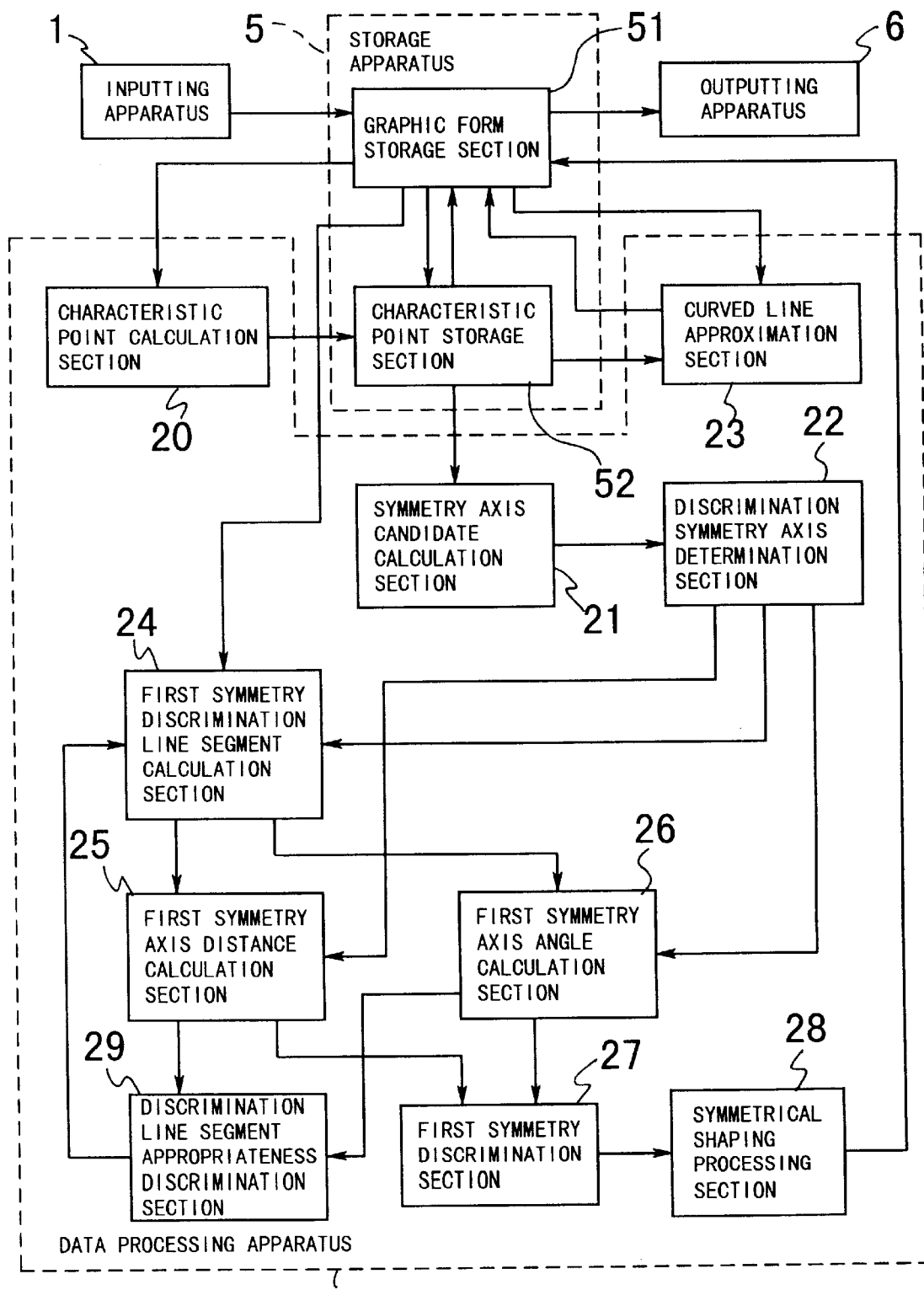
FIG. 10 is block diagram showing another graphic form shaping apparatus to which the present invention is applied.

Referring first to FIG. 10, the graphic form shaping apparatus according to the second preferred embodiment of the present invention is shown. The present graphic form shaping apparatus is a modification to and is different from the graphic form shaping apparatus described hereinabove with reference to FIG. 1 only in that it includes a data processing apparatus 7 in place of the data processing apparatus 2. The data processing apparatus 7 is common in construction to the data processing apparatus 2 except that it additionally includes a discrimination line segment appropriateness discrimination section 29. Here, description of common components is omitted to avoid redundancy.

2-2. Operation

Figure 11:
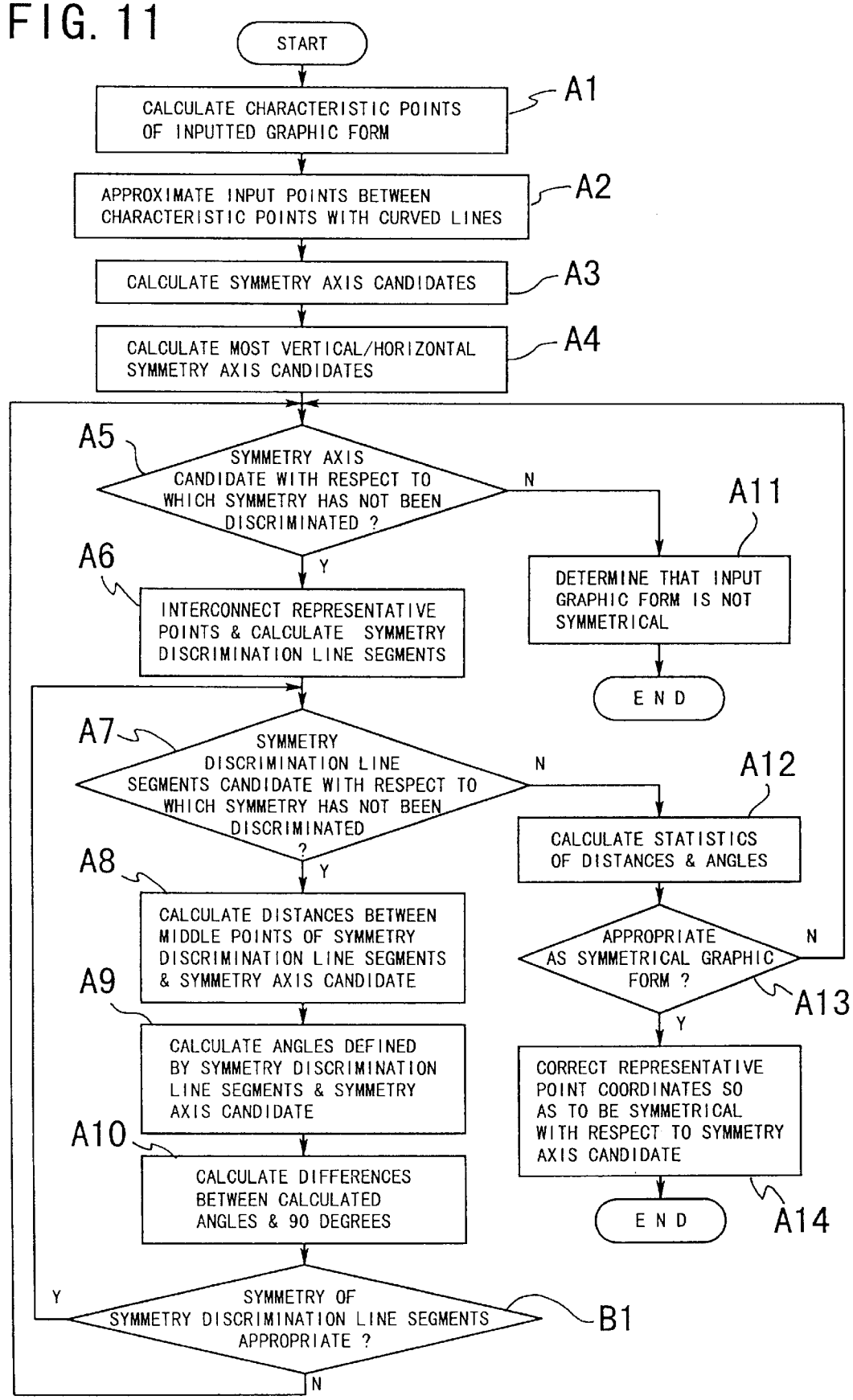
FIG. 11 is a flow chart illustrating a processing procedure of the graphic form shaping apparatus shown in FIG. 10.

Operation of the graphic form shaping apparatus shown in FIG. 10 is described below with reference to FIG. 10 and FIG. 11 which is a flow chart illustrating a flow of processing of the graphic form shaping apparatus of FIG. 10.

Operation of the characteristic point calculation section 20, symmetry axis candidate calculation section 21, discrimination symmetry axis determination section 22, curved line approximation section 23, first symmetry discrimination line segment calculation section 24, first symmetry axis distance calculation section 25, first symmetry axis angle calculation section 26, first symmetry discrimination section 27 and symmetrical shaping processing section 28 (steps A1 to A10, A11, and A12 to A14 of FIG. 11) is similar to that of the processing of the graphic form shaping apparatus of FIG. 1 described hereinabove. Accordingly, overlapping description of the operation is omitted here to avoid redundancy.

In the graphic form shaping apparatus of FIG. 1, after distances between a single symmetry axis candidate and the middle points of all symmetry discrimination line segments and angular differences between angles defined by the symmetry discrimination line segments and the symmetry axis candidate and 90 degrees are calculated, it is discriminated by the first symmetry discrimination section 27 whether or not the symmetry axis candidate is appropriate as a symmetry axis of the input graphic form.

In contrast, in the graphic form shaping apparatus of FIG. 10, after distances and angular differences with respect to a single symmetry discrimination line segment are calculated, the discrimination line segment appropriateness discrimination section 29 discriminates whether or not the values of the distances and the angular distances thus calculated come out of ranges individually provided by certain fixed threshold values.

If the values of the distances and angular differences are included in the ranges, it is determined that the input graphic form may possibly be symmetrical with respect to the symmetry axis candidate, and the processing returns to step A7 to perform processing for a new symmetry discrimination line segment. On the other hand, if the values of the distances and the angular differences come out of the individual ranges, it is determined that the input graphic form is not symmetrical with respect to the symmetry axis candidate, and the processing returns to step A4 to perform processing for a new symmetry axis candidate (step B1).

With the graphic form shaping apparatus of the present embodiment, when a symmetry axis candidate which provides no symmetry is present, the symmetry axis candidate is abandoned at an earlier stage. Consequently, the graphic form shaping apparatus of the present embodiment is improved in processing speed with respect to the graphic form shaping apparatus of the first embodiment.

3. Third Embodiment

Subsequently, a further graphic form shaping apparatus to which the present invention is applied is described.

3-1. Construction

Figure 12:
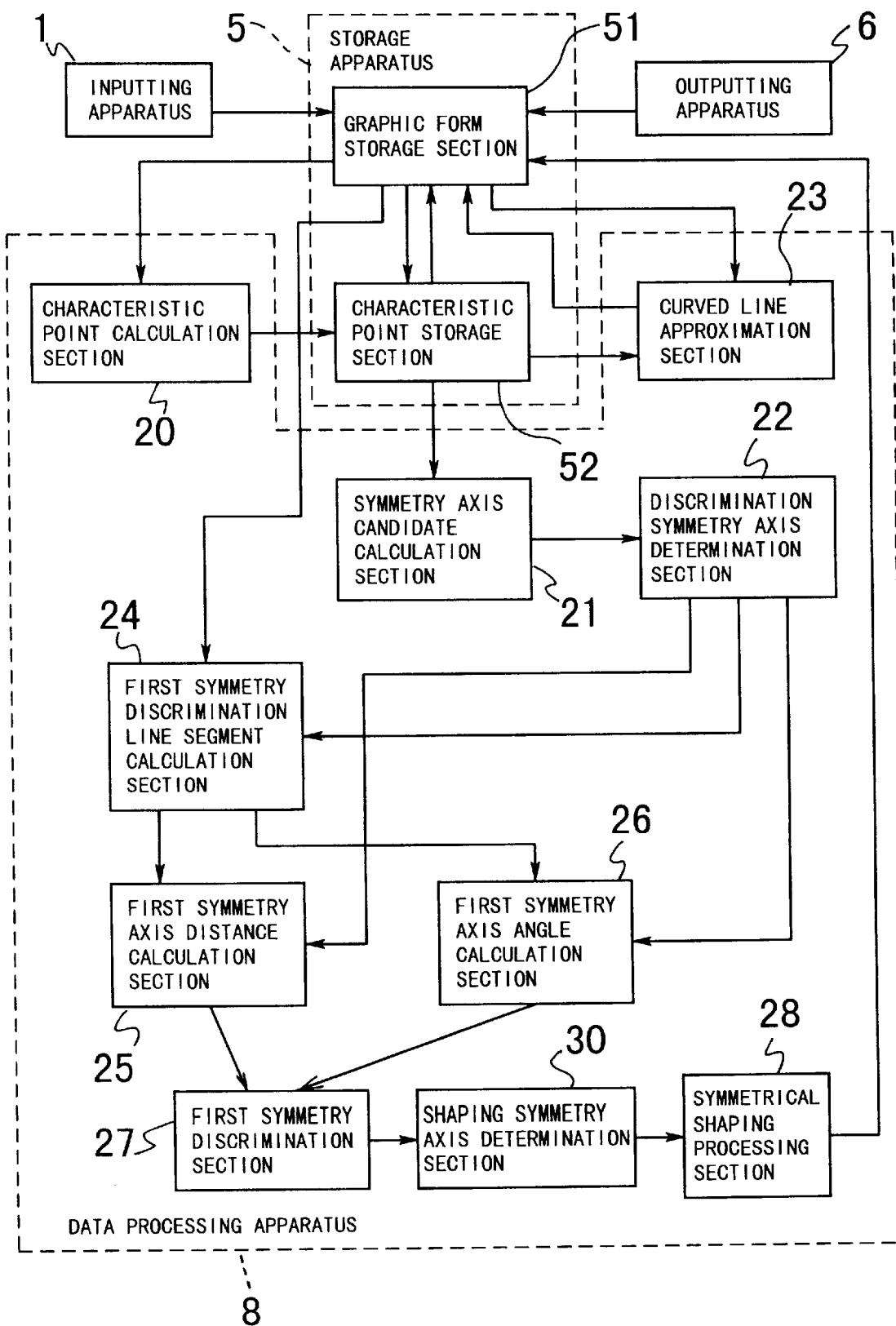
FIG. 12 is block diagram showing a further graphic form shaping apparatus to which the present invention is applied.

Referring first to FIG. 12, the graphic form shaping apparatus according to the third preferred embodiment of the present invention is shown. The present graphic form shaping apparatus is a modification to and is different from the graphic form shaping apparatus described hereinabove with reference to FIG. 1 only in that it includes a data processing apparatus 8 in place of the data processing apparatus 2. The data processing apparatus 8 is common in construction to the data processing apparatus 2 except that it additionally includes a shaping symmetry axis determination section 30. Here, description of common components is omitted to avoid redundancy.

3-2. Operation

Figure 13:
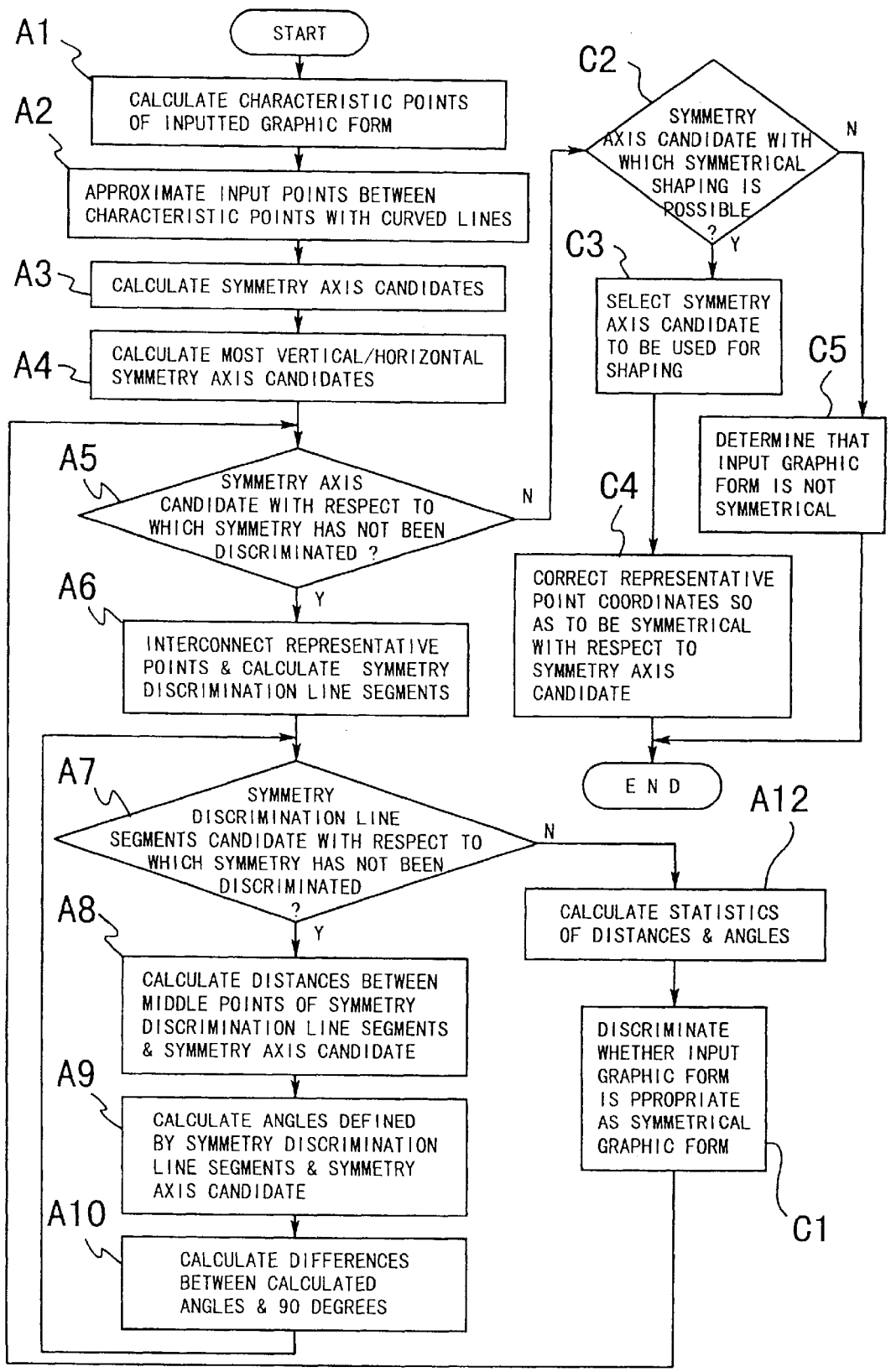
FIG. 13 is a flow chart illustrating a processing procedure of the graphic form shaping apparatus shown in FIG. 12.

Operation of the graphic form shaping apparatus shown in FIG. 12 is described below with reference to FIG. 12 and FIG. 13 which is a flow chart illustrating a flow of processing of the graphic form shaping apparatus of FIG. 12.

Operation of the characteristic point calculation section 20, symmetry axis candidate calculation section 21, discrimination symmetry axis determination section 22, curved line approximation section 23, first symmetry discrimination line segment calculation section 24, first symmetry axis distance calculation section 25, and first symmetry axis angle calculation section 26 (steps A1 to A10 and A12 of FIG. 13) is similar to that of the processing of the graphic form shaping apparatus of FIG. 1 described hereinabove.

Accordingly, overlapping description of the operation is omitted here to avoid redundancy.

In the graphic form shaping apparatus of FIG. 1, when statistics of distances and angular differences calculated in step A10 fall within ranges provided by certain threshold values, line symmetrical shaping is performed using the symmetry axis candidate.

In the graphic form shaping apparatus of the present embodiment, after the appropriateness of a symmetry axis candidate as a symmetry axis is calculated, this is stored into the storage apparatus 5 (step C1). After the line symmetry of the input graphic form is discriminated for both of the horizontal and vertical symmetry axis candidates (step A4), if a symmetry axis candidate or candidates which are appropriate for a symmetry axis are present, then the shaping symmetry axis determination section 30 determines a symmetry axis candidate to be used as a symmetry axis. As a method for determination of a symmetry axis, a method wherein a user selects or another method wherein one of symmetry axis candidates which exhibits the highest symmetry is selected may be used.

Thereafter, in order to make the input graphic form symmetrical with respect to the thus determined symmetry axis candidate, correction of the coordinates of the characteristic points and the representative points is performed so that the pairs of the characteristic points and the representative points which form the individual symmetry discrimination line segments calculated by the first symmetry discrimination line segment calculation section 24 may be symmetrical with respect to the corrected symmetry axis (step C4).

It is to be noted that, if there is no symmetry axis candidate appropriate as a symmetry axis, then it is determined that the input graphic form is not a line symmetrical graphic form (step C5).

With the graphic form shaping apparatus of the present embodiment, when both of symmetry axis candidates in horizontal and vertical directions are appropriate as symmetry axes of an input graphic form, it can be determined which one of the symmetry axis candidates should be used. Consequently, a shaping result conforming better to an intention of a user can be obtained. Or, a line symmetrical graphic form shaped to a shape nearest to that of the input graphic form is obtained.

4. Fourth Embodiment

Subsequently, a still further graphic form shaping apparatus to which the present invention is applied is described.

4-1. Construction

Figure 14:
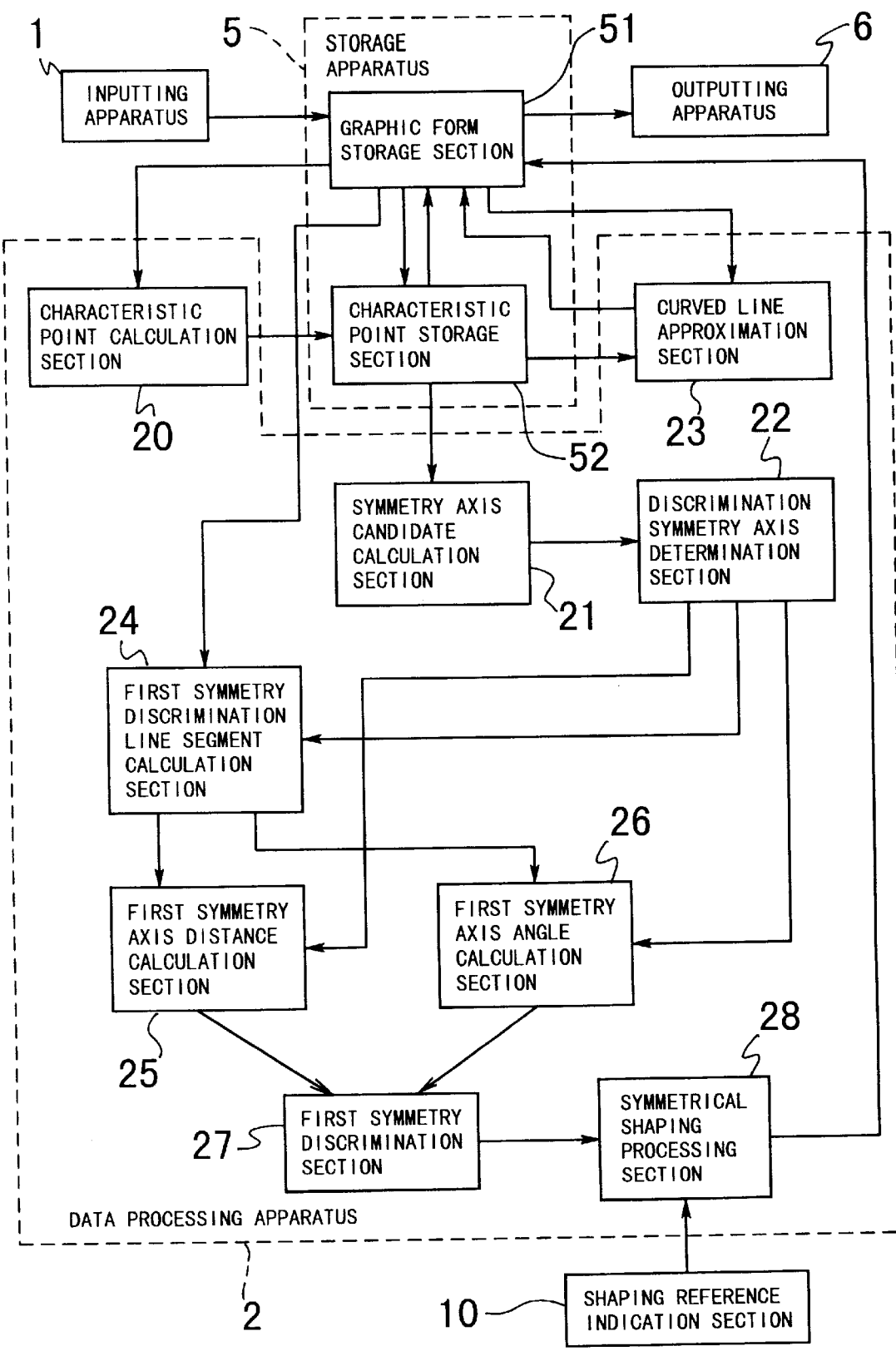
FIG. 14 is block diagram showing a still further graphic form shaping apparatus to which the present invention is applied.

Referring to FIG. 14, the graphic form shaping apparatus according to the fourth preferred embodiment of the present invention is shown. The present graphic form shaping apparatus is a modification to and is different from the graphic form shaping apparatus described hereinabove with reference to FIG. 1 only in that it additionally includes a shaping reference indication section 10. Here, description of common components is omitted to avoid redundancy.

4-2. Operation

Figure 15:
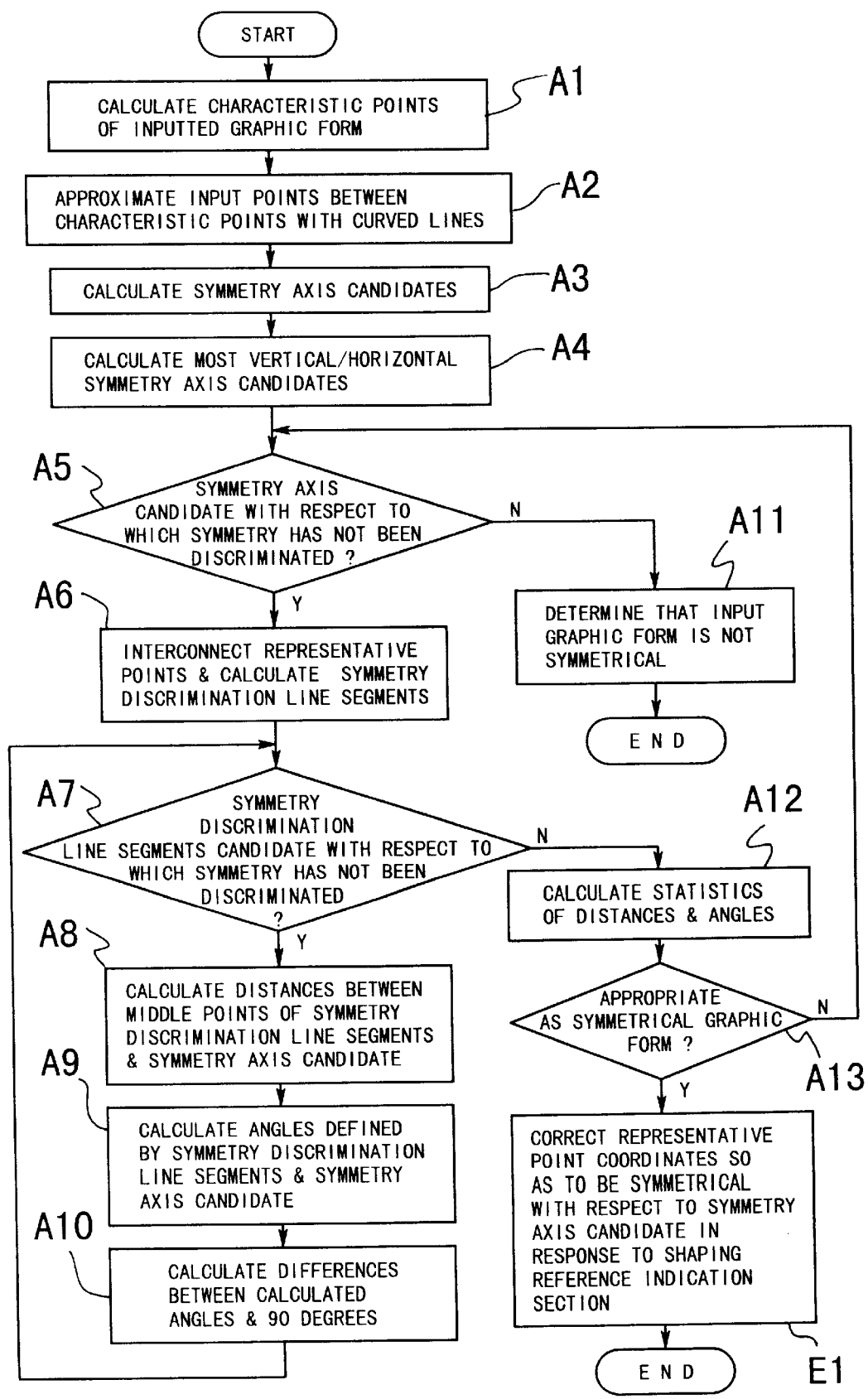
FIG. 15 is a flow chart illustrating a processing procedure of the graphic form shaping apparatus shown in FIG. 14.

Operation of the graphic form shaping apparatus shown in FIG. 14 is described below with reference to FIG. 14 and FIG. 15 which is a flow chart illustrating a flow of processing of the graphic form shaping apparatus of FIG. 14.

Operation of the characteristic point calculation section 20, symmetry axis candidate calculation section 21, discrimination symmetry axis determination section 22, curved line approximation section 23, first symmetry discrimination line segment calculation section 24, first symmetry axis distance calculation section 25, first symmetry axis angle calculation section 26, and first symmetry discrimination section 27 (steps A1 to A10, A11, A12 and A13) is similar to that of the processing of the graphic form shaping apparatus of FIG. 1 described hereinabove. Accordingly, overlapping description of the operation is omitted here to avoid redundancy.

If it is discriminated by the first symmetry discrimination section 27 that an input graphic form is a line symmetrical graphic form, then the shaping reference indication section 10 indicates the position of a symmetry axis or a factor to be referred to for shaping. For example, the following factors may be used.

1) How to determine the position of a symmetry axis

For a vertical axis: an upper (lower or middle) one of cross points between a symmetry axis candidate and an input graphical form.

For a horizontal axis: a left (right or middle) one of cross points between a symmetry axis candidate and an input graphical form.

2) Method of correcting coordinates of characteristic points and representative points For a vertical axis: a coordinate point on the left side of a symmetry axis (coordinate point on the right side, a cross point between a symmetry axis and a symmetry discrimination line segment) is referred to.

For a horizontal axis: a coordinate point on the upper side of a symmetry axis (coordinate point on the lower side, a cross point between a symmetry axis and a symmetry discrimination line segment) is referred to.

The symmetrical shaping processing section 28 performs shaping of the graphic form in accordance with contents of the indication of the shaping reference indication section 10 (step E1).

With the graphic form shaping apparatus of the present embodiment, since the position of a symmetry axis or a factor to be referred to by a coordinate point to be corrected can be indicated upon symmetrical shaping processing, a line symmetrical graphic form which conforms better to an intention of a user can be inputted.

5. Fifth Embodiment

Subsequently, a yet further graphic form shaping apparatus to which the present invention is applied is described.

5-1. Construction

Figure 16:
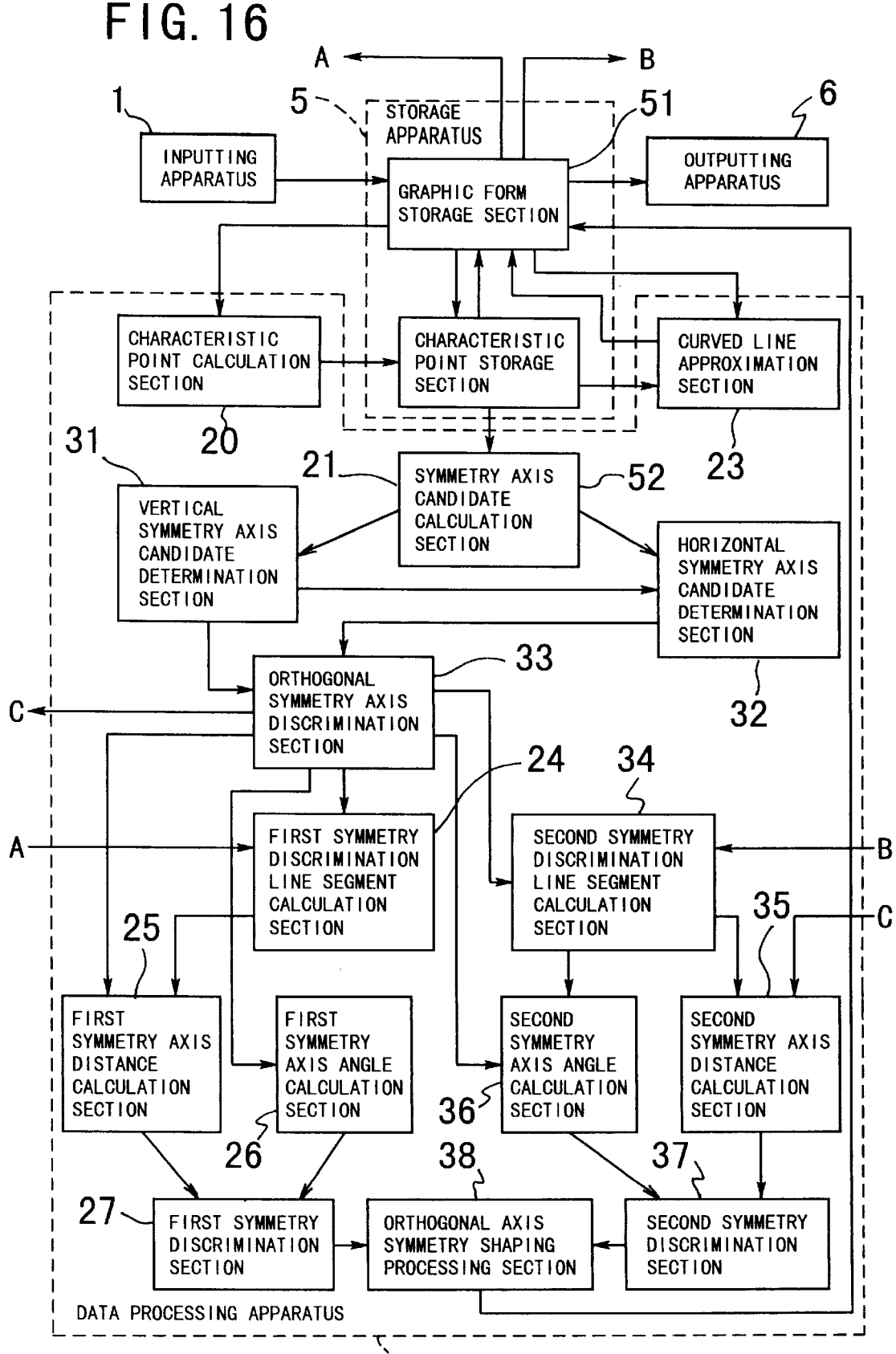
FIG. 16 is block diagram showing a yet further graphic form shaping apparatus to which the present invention is applied.

Referring to FIG. 16, the graphic form shaping apparatus according to the fifth preferred embodiment of the present invention is shown. The present graphic form shaping apparatus includes an inputting apparatus 1 for inputting a graphic form using a keyboard, a mouse, a pen or the like, a data processing apparatus 11 which operates by program control, a storage apparatus 5 for storing graphic form information, characteristic points and so forth, and an outputting apparatus 6 such as a display unit or a printer.

The data processing apparatus 11 includes a characteristic point calculation section 20, a symmetry axis candidate calculation section 21, a vertical symmetry axis candidate determination section 31, a horizontal symmetry axis candidate determination section 32, an orthogonal symmetry axis discrimination section 33, a first symmetry discrimination line segment calculation section 24, a first symmetry axis distance calculation section 25, a first symmetry axis angle calculation section 26, a first symmetry discrimination section 27, a second symmetry discrimination line segment calculation section 34, a second symmetry axis distance calculation section 35, a second symmetry axis angle calculation section 36, a second symmetry discrimination section 37, and an orthogonal axis symmetry shaping processing section 38.

The storage apparatus 5 includes a graphic form storage section 51 and a characteristic point storage section 52.

A detailed construction of the data processing apparatus 11 is described below.

A graphic form inputted from the inputting apparatus 1 is stored as a train of coordinate points which trace a locus of a curved line into the graphic form storage section 51.

The characteristic point calculation section 20 calculates coordinates of apexes and maximal points and minimal points in a horizontal direction and a vertical direction from the input coordinate point train stored in the graphic form storage section 51 and stores the calculated values as characteristic points of the input graphic form into the characteristic point storage section 52. The graphic form stored in the graphic form storage section 51 and the characteristic points stored in the characteristic point storage section 52 are coordinated with each other.

The curved line approximation section 23 performs curved line approximation of the coordinate point train of the input graphic form between the characteristic points with approximate curved lines to calculate representative points of the approximate curved lines. The produced representative points are stored into the graphic form storage section 51 together with the characteristic points stored in the discrimination symmetry axis determination section 22.

The symmetry axis candidate calculation section 21 calculates symmetry axis candidates to be used for symmetry discrimination from the characteristic points stored in the characteristic point storage section 52.

The vertical symmetry axis candidate determination section 31 extracts one most vertical symmetry axis candidate from among all of the symmetry axis candidates calculated by the symmetry axis candidate calculation section 21. Further, the horizontal symmetry axis candidate determination section 32 extracts that one of the symmetry axis candidates calculated by the symmetry axis candidate calculation section 21 which is to make a horizontal symmetry axis candidate using the vertical symmetry axis candidate extracted by the vertical symmetry axis candidate determination section 31.

The orthogonal symmetry axis discrimination section 33 discriminates whether or not the two symmetry axis candidates extracted by the vertical symmetry axis candidate determination section 31 and the horizontal symmetry axis candidate determination section 32 cross perpendicularly to each other.

If it is discriminated by the orthogonal symmetry axis discrimination section 33 that the two symmetry axis candidates cross perpendicularly to each other, then the first symmetry discrimination line segment calculation section 24 traces, from one of characteristic points through which the symmetry axis candidate calculated by the shaping symmetry axis determination section 30 passes toward the other characteristic point of the symmetry axis candidate, the characteristic points and the representative points to calculate pairs of the characteristic points and the representative points which are used as pairs for discrimination of symmetry of the input graphic form and interconnects the pairs of the characteristic points and the representative points with straight lines to form symmetry discrimination line segments.

The first symmetry axis distance calculation section 25 calculates the distance between a middle point of each of the symmetry discrimination line segments and the symmetry axis candidate.

The first symmetry axis angle calculation section 26 calculates the angle defined by each of the symmetry discrimination line segments and the symmetry axis candidate and calculates a difference between the angle and 90 degrees.

The first symmetry discrimination section 27 calculates a statistic of the values of the distances between the middle points of all of the symmetry discrimination line segments and the symmetry axis candidates calculated by the first symmetry axis distance calculation section 25 and a statistic of the differences between the angles defined by all of the symmetry discrimination line segments and the symmetry axis candidates and 90 degrees calculated by the first symmetry axis angle calculation section 26 to discriminate line symmetry of the input graphic form.

Also for the horizontal symmetry axis candidate extracted by the horizontal symmetry axis candidate determination section 32, similar processing is performed by the second symmetry discrimination line segment calculation section 34, second symmetry axis distance calculation section 35, second symmetry axis angle calculation section 36 and second symmetry discrimination section 37.

If the input graphic form has been discriminated to be symmetrical with respect to both of the vertical symmetry axis candidate and the horizontal symmetry axis candidate, then the orthogonal axis symmetry shaping processing section 38 varies the coordinates of the pairs of the characteristic points and the representative points so that the graphic form may be line symmetrical with respect to both of the symmetry axis candidates. The graphic form thus produced is stored into the graphic form storage section 51 and outputted as an approximate curve line to the outputting apparatus 6.

5-2. Operation

Operation of the graphic form shaping apparatus of the fifth embodiment of the present invention described above is described below with reference to FIGS. 16 to 21.

A graphic form inputted from the inputting apparatus 1 is stored as an input coordinate point train, which traces a locus of a curved line, into the graphic form storage section 51.

The characteristic point calculation section 20 calculates coordinates of apexes and maximal points and minimal points in a horizontal direction and a vertical direction from the input coordinate point train and stores resulting values as characteristic points of the input graphic form into the characteristic point storage section 52. Further, the input graphic form is outputted to the outputting apparatus 6 (step F1 of FIG. 17(A)).

Then, the curved line approximation section 23 performs curved line approximation with a spline curve or a Bezier curve using the input coordinate points between the characteristic points calculated by the characteristic point calculation section 20. In this instance, the numbers of such representative points between the individual characteristic points are selected so as to be equal to each other. The representative points are stored into the graphic form storage section 51 together with the characteristic pints (step F2 of FIG. 17(A)).

Thereafter, the symmetry axis candidate calculation section 21 refers to the characteristic points stored in the characteristic point storage section 52 to combine, where the input graphic form has n characteristic points, each mth and n/2+mth (m=1, 2, . . . ) characteristic points and determines the individual pairs as symmetry axis candidates (step F3). For example, from such an input graphic form as shown in FIG. 18(1), four symmetry axis candidates shown in FIG. 19 are calculated.

Then, the vertical symmetry axis candidate determination section 31 extracts a most vertical symmetry axis candidate from among all of the symmetry axis candidates calculated by the symmetry axis candidate calculation section 21. Further, the horizontal symmetry axis candidate determination section 32 extracts a horizontal symmetry axis candidate using the vertical symmetry axis candidate extracted by the vertical symmetry axis candidate determination section 31.

Figure 18:
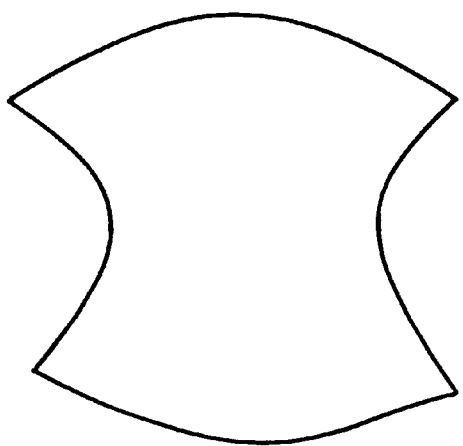
FIGS. 18(1) and 18(2) are diagrammatic views showing an example of an input graphic form and a graphic form, respectively, obtained by shaping the input graphic form by the graphic form shaping apparatus shown in FIG. 16.
Figure 18:
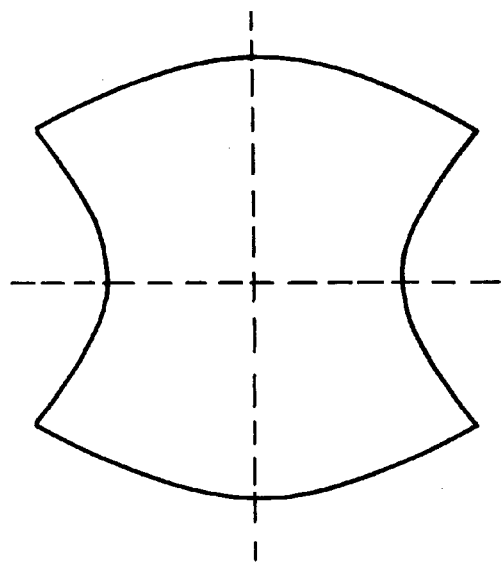
Figure 19:
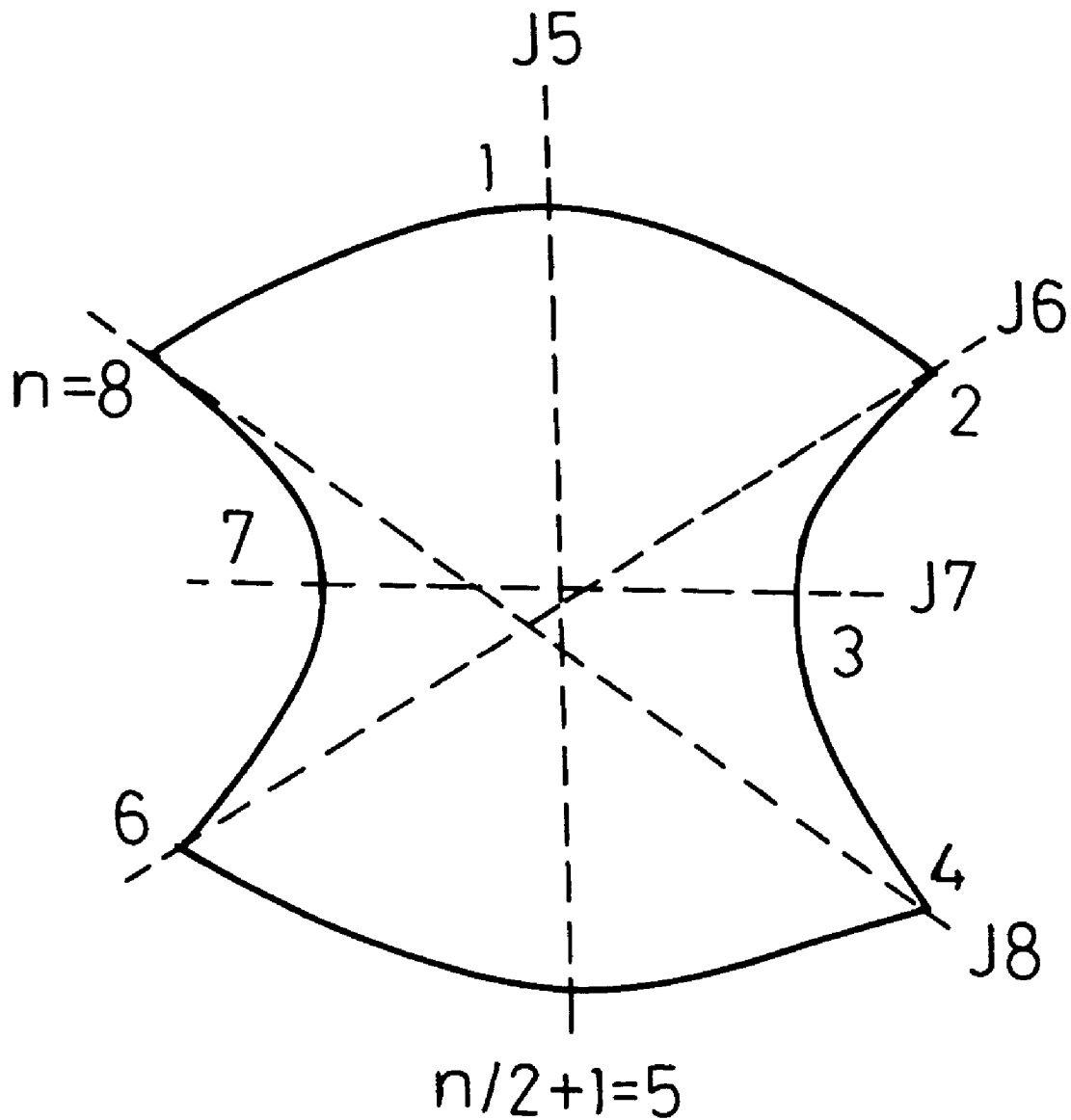
FIG. 19 is a diagrammatic view showing an example of symmetry axis candidates calculated by a symmetry axis candidate calculation section of the graphic form shaping apparatus shown in FIG. 16.
Figure 20:
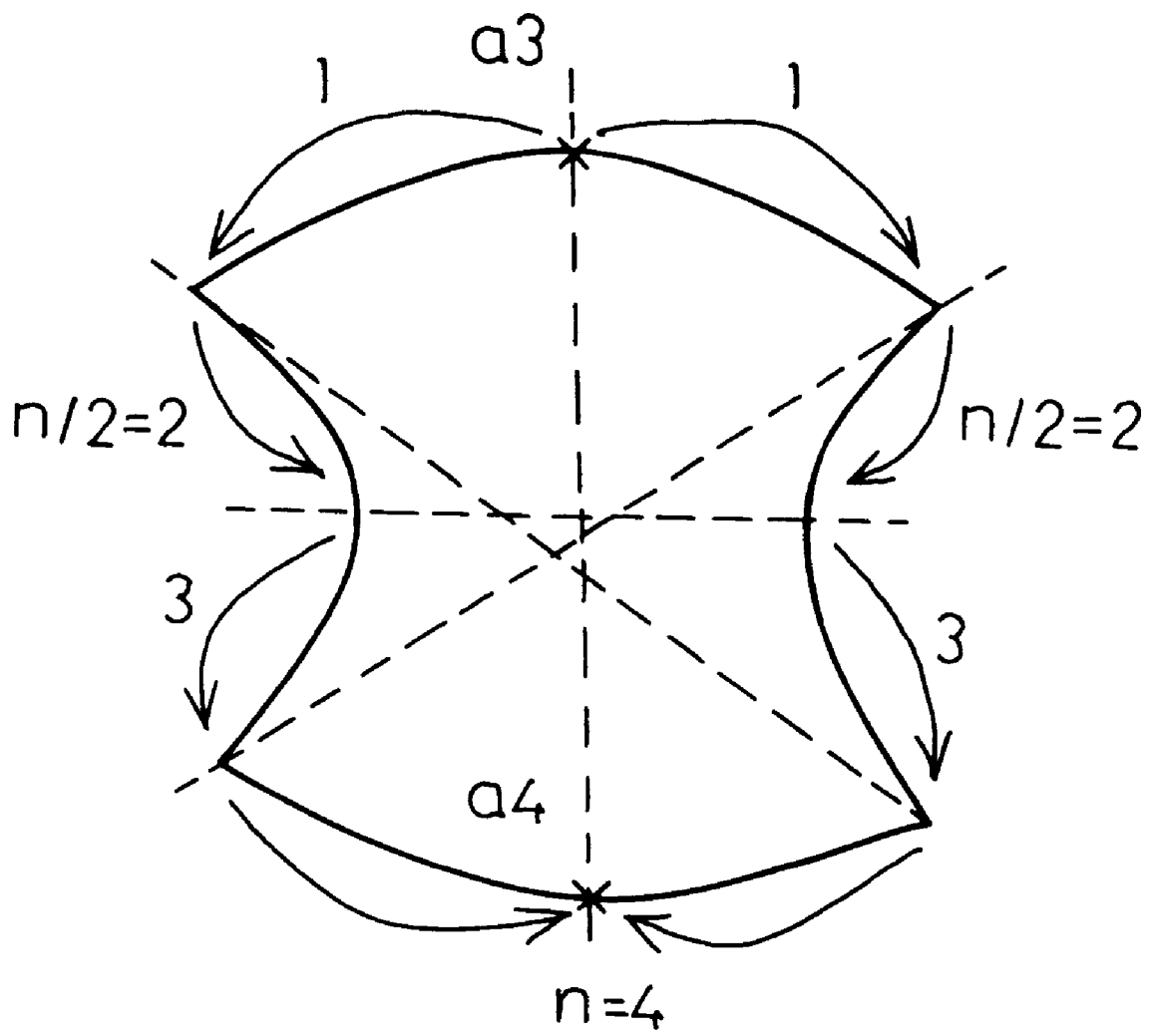
FIG. 20 is a diagrammatic view illustrating an example of processing of determining a horizontal symmetric axis candidate from among the symmetry axis candidates shown in FIG. 19 using a vertical symmetry axis candidate extracted by a vertical symmetry axis candidate determination section of the graphic form shaping apparatus shown in FIG. 16.
Figure 21:
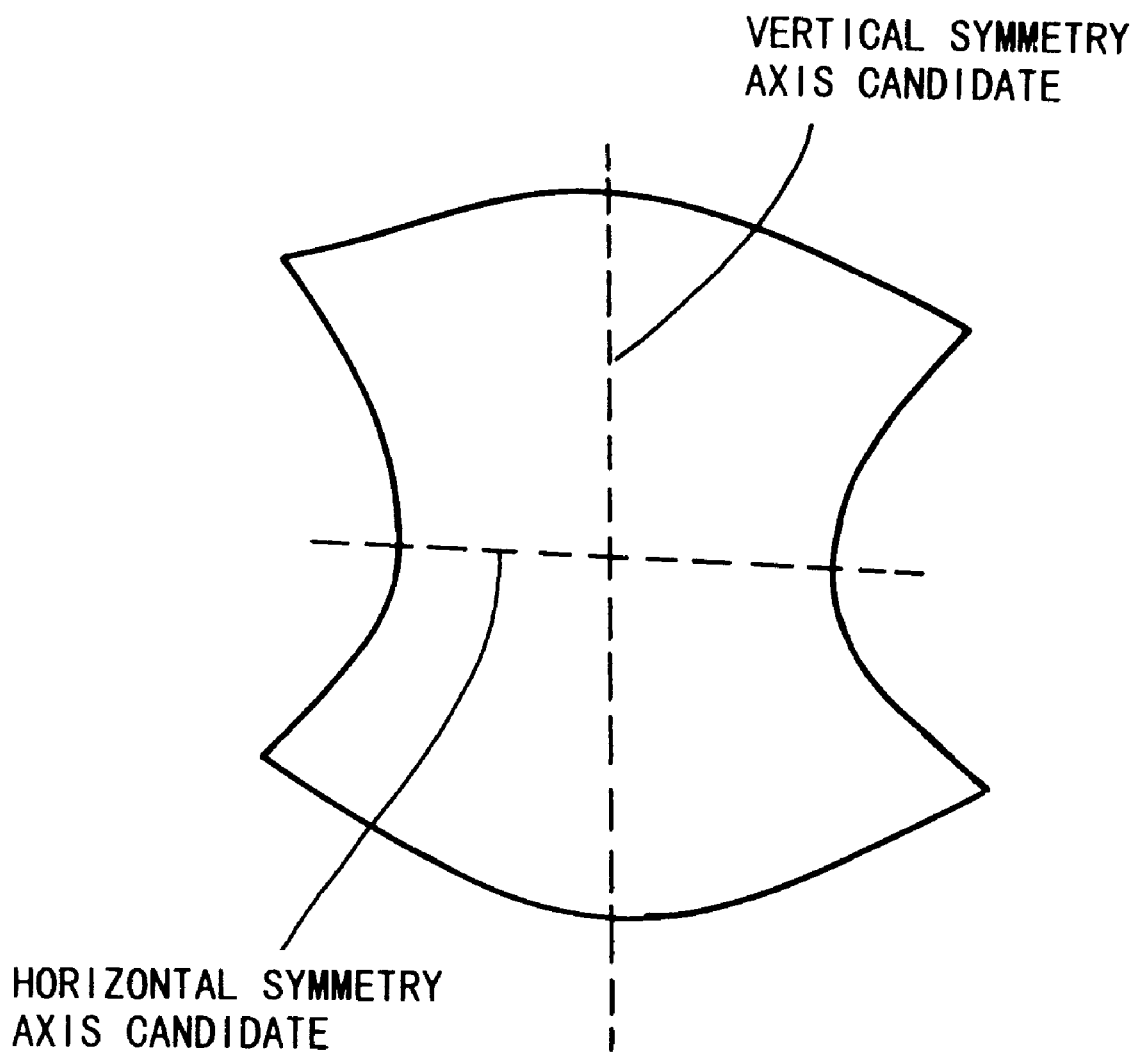
FIG. 21 is a diagrammatic view showing an example of a vertical symmetry axis candidate and a horizontal symmetry axis candidate extracted from the symmetry axis candidates shown in FIG. 19 by a vertical symmetry axis candidate determination section and a horizontal symmetry axis candidate determination section of the graphic form shaping apparatus shown in FIG. 16, respectively.

In the case of such an input graphic form as shown in FIG. 18(1), if a straight line which passes the characteristic points a3 and a4 as shown in FIG. 20 is extracted as a vertical symmetry axis candidate, then the horizontal symmetry axis candidate determination section 32 successively traces the characteristic points on the opposite sides of the vertical symmetry axis candidate from one a3 of the characteristic points a3 and a4 through which the vertical axis candidate passes toward the other characteristic point a4. Where the number of characteristic points traced is n (n is an integer), the straight line which interconnects the points of n/2 is determined as a horizontal symmetry axis candidate. In the case of the input graphic form described above, such a pair of symmetry axis candidates as seen in FIG. 21 are calculated (step F4).

Thereafter, the orthogonal symmetry axis discrimination section 33 calculates an angle defined by the two symmetry axes in pair. If the angle thus calculated is not within a range near to and around 90 degrees, then it is determined that the symmetry axis candidates in pair have no possibility that they may make orthogonal axes, and it is determined that the input graphic form is not symmetrical with respect to orthogonal symmetry axes (steps F5 and F9).

It is to be noted that, if the orthogonal symmetry axis discrimination section 33 determines that the symmetry axis candidates in pair extend perpendicularly to each other, then symmetry of the input graphic form with respect to the vertical symmetry axis candidate is discriminated (step F6). It is to be noted that operation (steps F10 to F16) for symmetry discrimination by the first symmetry discrimination line segment calculation section 24, first symmetry axis distance calculation section 25, first symmetry axis angle calculation section 26 and first symmetry discrimination section 27 is same as the operation (steps A6 to A1, A12 and A13 in FIG. 2) for symmetry discrimination in the graphic form shaping apparatus of the first embodiment, and overlapping description of the same is omitted here to avoid redundancy.

If the vertical symmetry axis candidate is determined to be appropriate as a symmetry axis of the input graphic form, then appropriateness of the horizontal symmetry axis candidate as a symmetry axis of the input graphic form is discriminated using the second symmetry discrimination line segment calculation section 34, second symmetry axis distance calculation section 35, second symmetry axis angle calculation section 36 and second symmetry discrimination section 37 (step F7).

If it is discriminated by the first symmetry discrimination section 27 and the second symmetry discrimination section 37 that both of the symmetrical axis candidates in pair are appropriate as symmetry axes of the input graphic form, then the orthogonal axis symmetry shaping processing section 38 first corrects the vertical symmetry axis candidate calculated by the vertical symmetry axis candidate determination section 31 to a vertical symmetry axis and then corrects the horizontal symmetry axis candidate calculated by the horizontal symmetry axis candidate determination section 32 to a horizontal symmetry axis similarly.

Then, correction of the coordinates of the characteristic points and the reference points is performed so that the input coordinate points in pairs of the input graphic form may be line symmetrical with respect to both of the orthogonal symmetry axes, and resulting values are stored into the graphic form storage section 51. The thus shaped graphic form is outputted as an appropriate curved line to the outputting apparatus 6 (step F8, FIG. 18(2)).

With the graphic form shaping apparatus of the present embodiment, it is possible to automatically extract orthogonal symmetry axes from a curved line graphic form inputted by a user and shape the input graphic form to a graphic form line symmetrical with respect to both of the orthogonal symmetry axes.

5-3. Modification

Figure 17A:
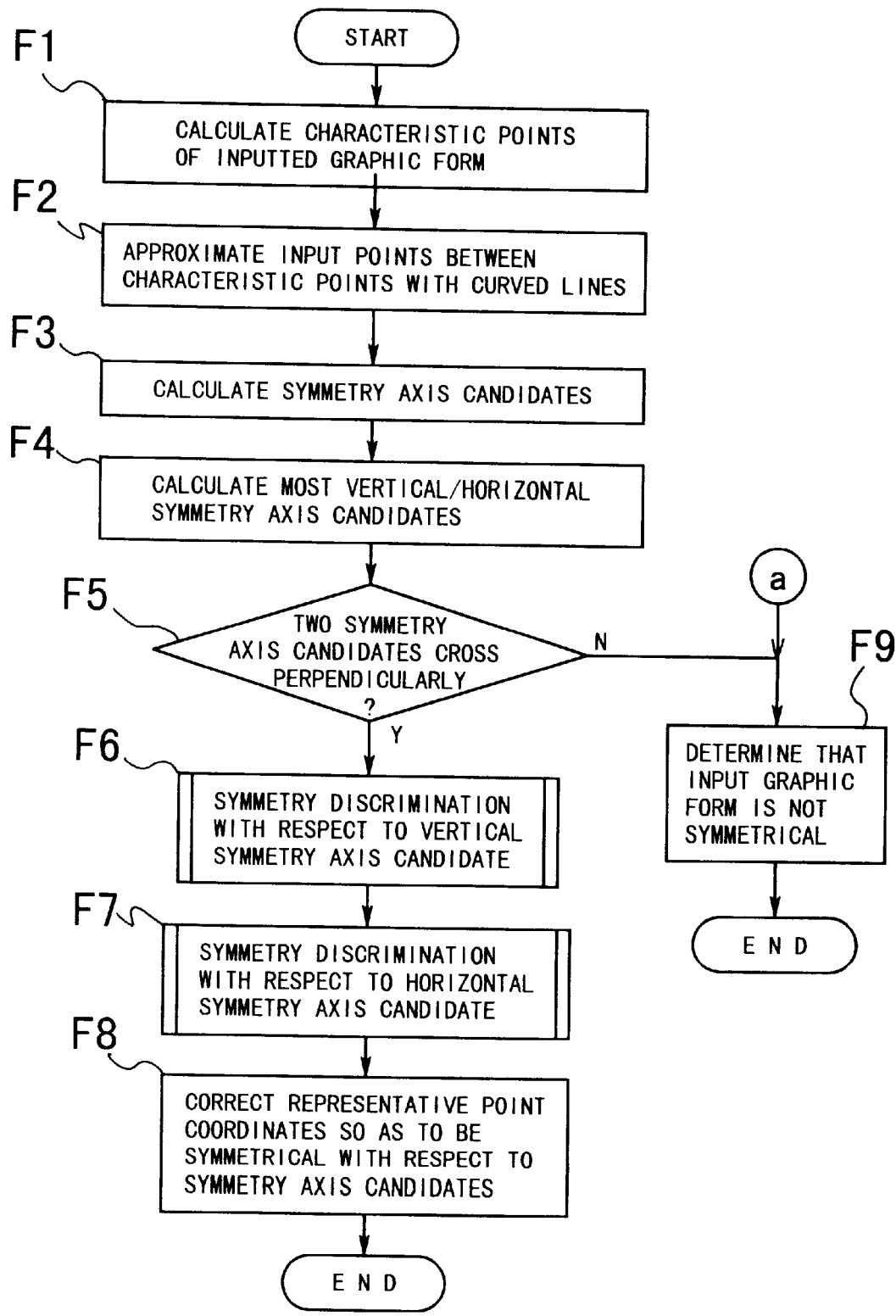
FIGS. 17(A) and 17(B) are flow charts illustrating a processing procedure of the graphic form shaping apparatus shown in FIG. 16.
Figure 17B:
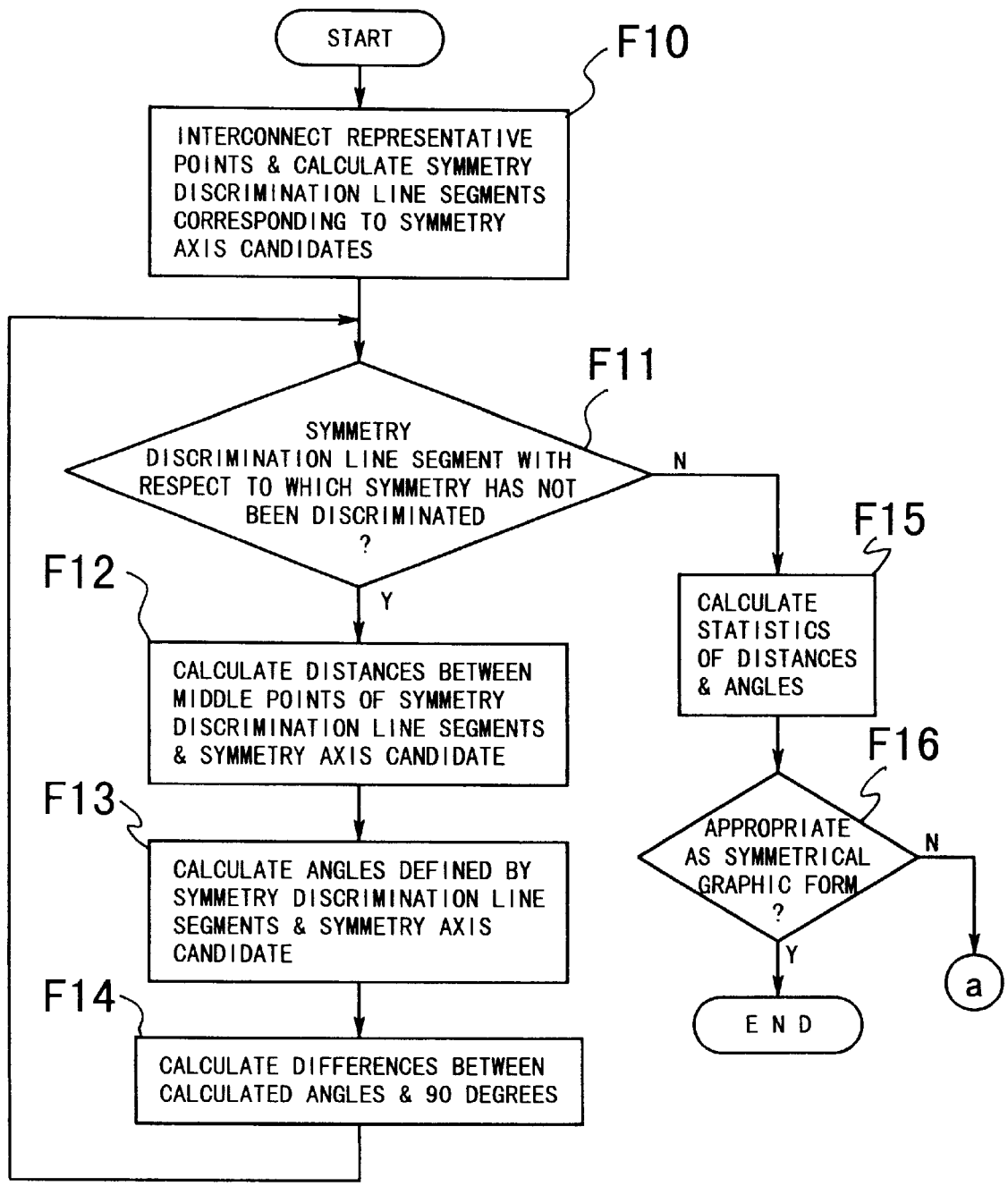
Figure 22:
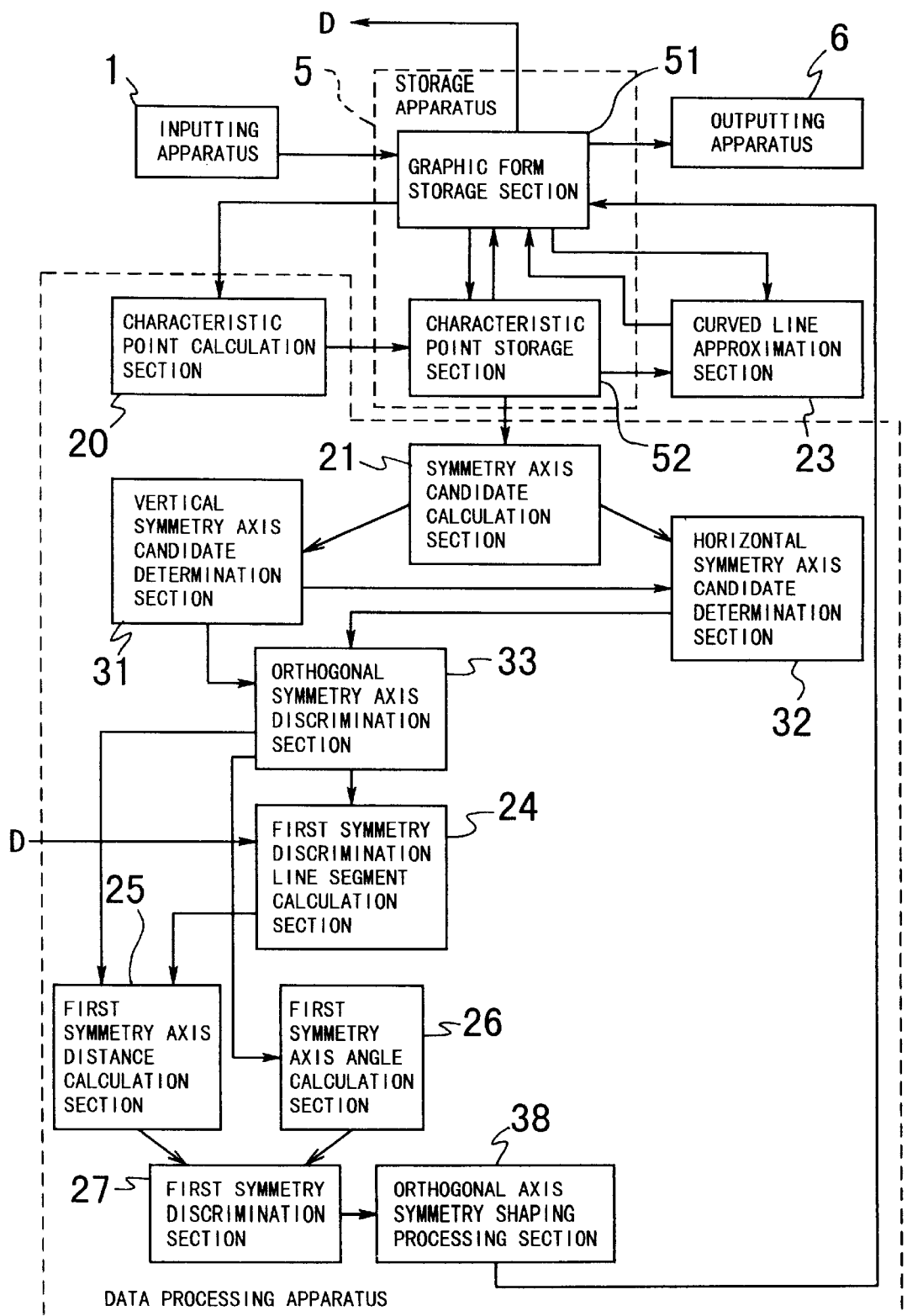
FIG. 22 is a block diagram showing a modification to the graphic form shaping apparatus shown in FIG. 16.

The graphic form shaping apparatus of the fifth embodiment described above can be modified such that, since similar operations are performed in steps F6 and F7 of FIG. 17(A), appropriateness of both of a vertical symmetry axis candidate and a horizontal symmetry axis candidate as symmetry axes is discriminated using the first symmetry discrimination line segment calculation section 24, first symmetry axis distance calculation section 25, first symmetry axis angle calculation section 26 and first symmetry discrimination section 27 as seen in FIG. 22.

By the modified graphic form shaping apparatus, a simplified construction can be achieved and a memory can be used efficiently.

6. Sixth Embodiment

Subsequently, a yet further graphic form shaping apparatus to which the present invention is applied is described.

6-1. Construction

Figure 23:
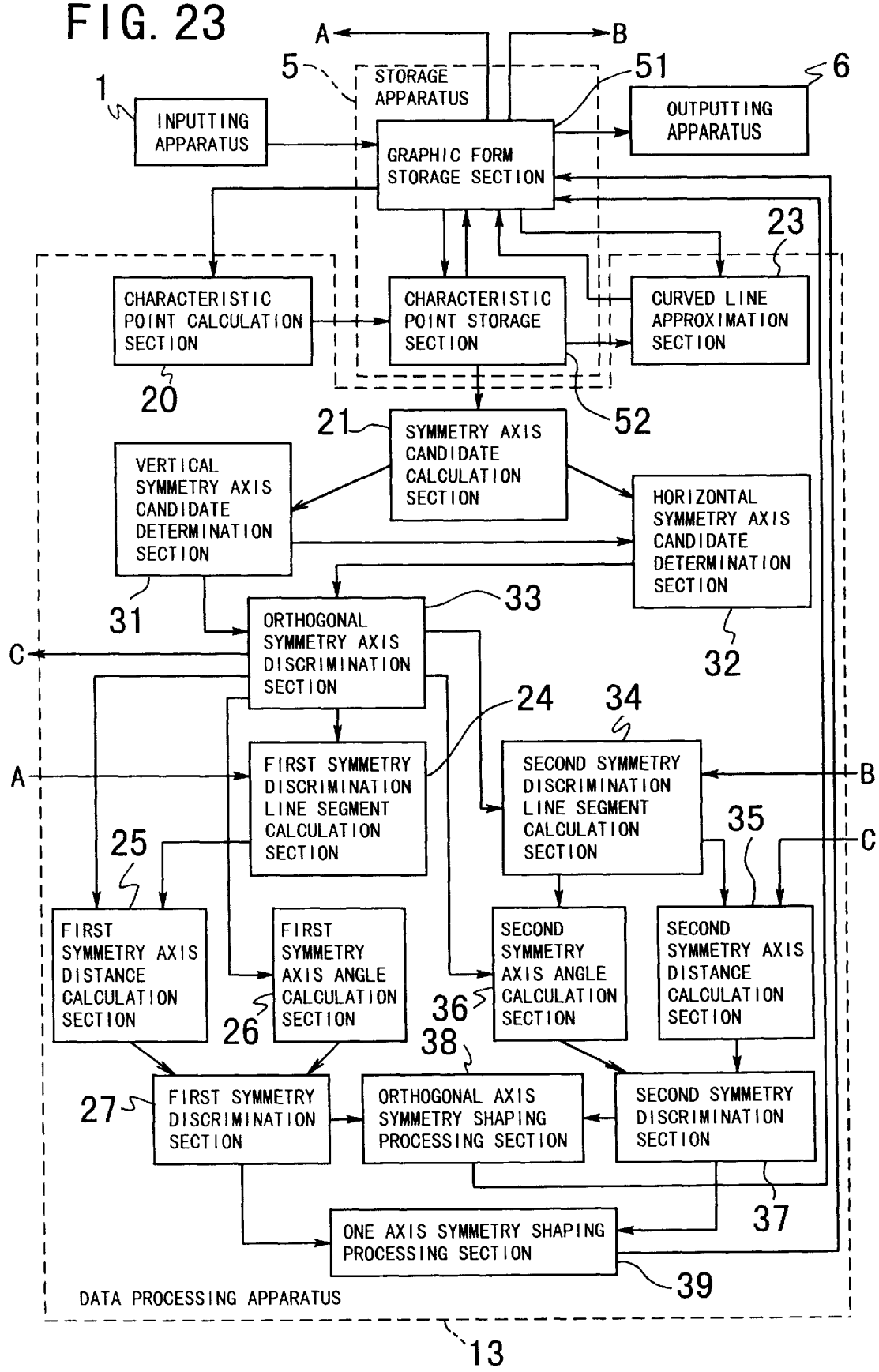
FIG. 23 is block diagram showing a yet further graphic form shaping apparatus to which the present invention is applied.

Referring to FIG. 23, the graphic form shaping apparatus according to the sixth preferred embodiment of the present invention is shown. The present graphic form shaping apparatus is a modification to and is different from the graphic form shaping apparatus described hereinabove with reference to FIG. 16 only in that the data processing apparatus 11 thereof additionally includes a one axis symmetry shaping processing section 39. Here, description of common components is omitted to avoid redundancy.

6-2. Operation

Operation of the graphic form shaping apparatus shown in FIG. 23 is described below with reference to FIGS. 23 and 24.

Figure 24A:
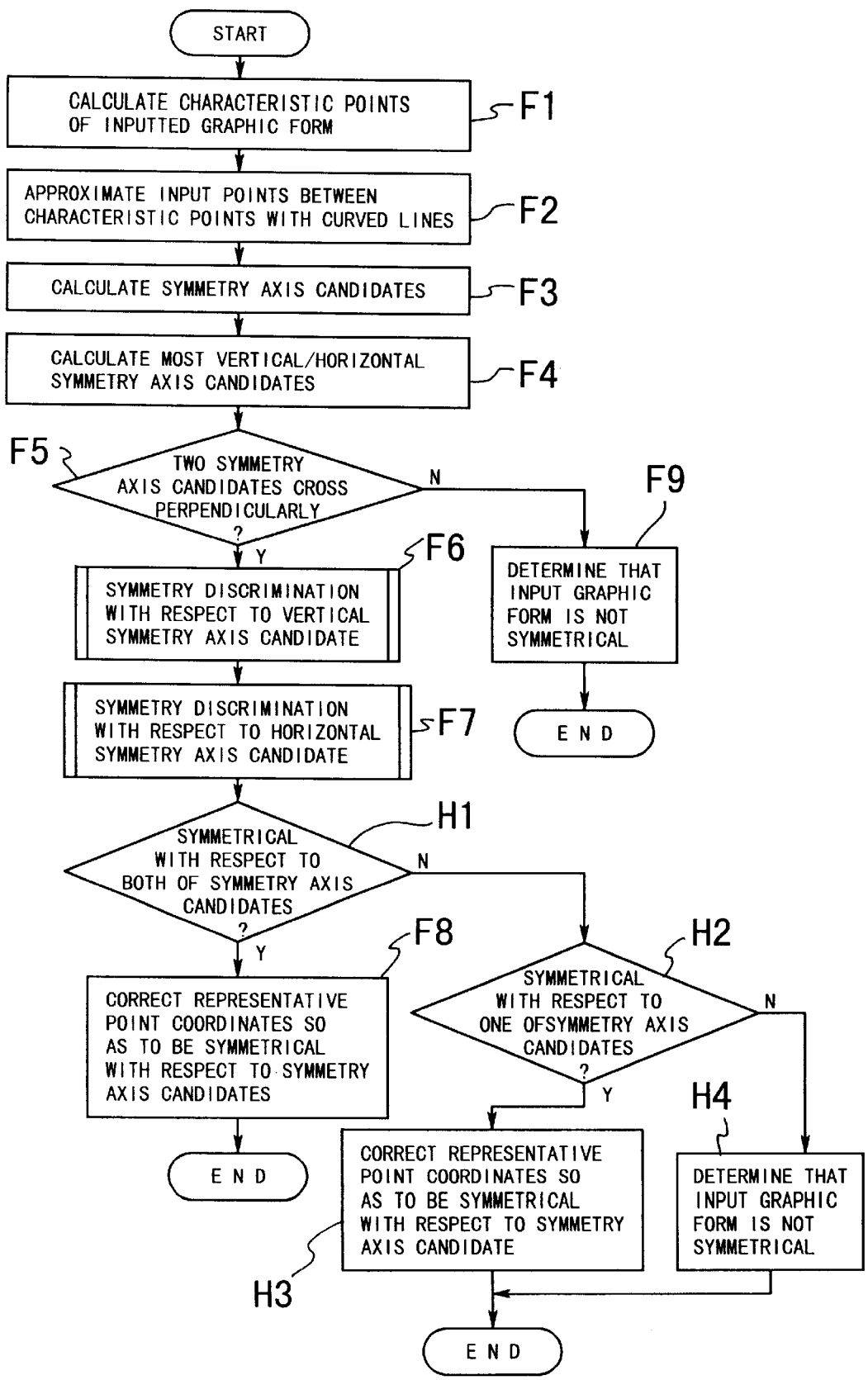
FIGS. 24(A) and 24(B) are flow charts illustrating a processing procedure of the graphic form shaping apparatus shown in FIG. 23.
Figure 24B:
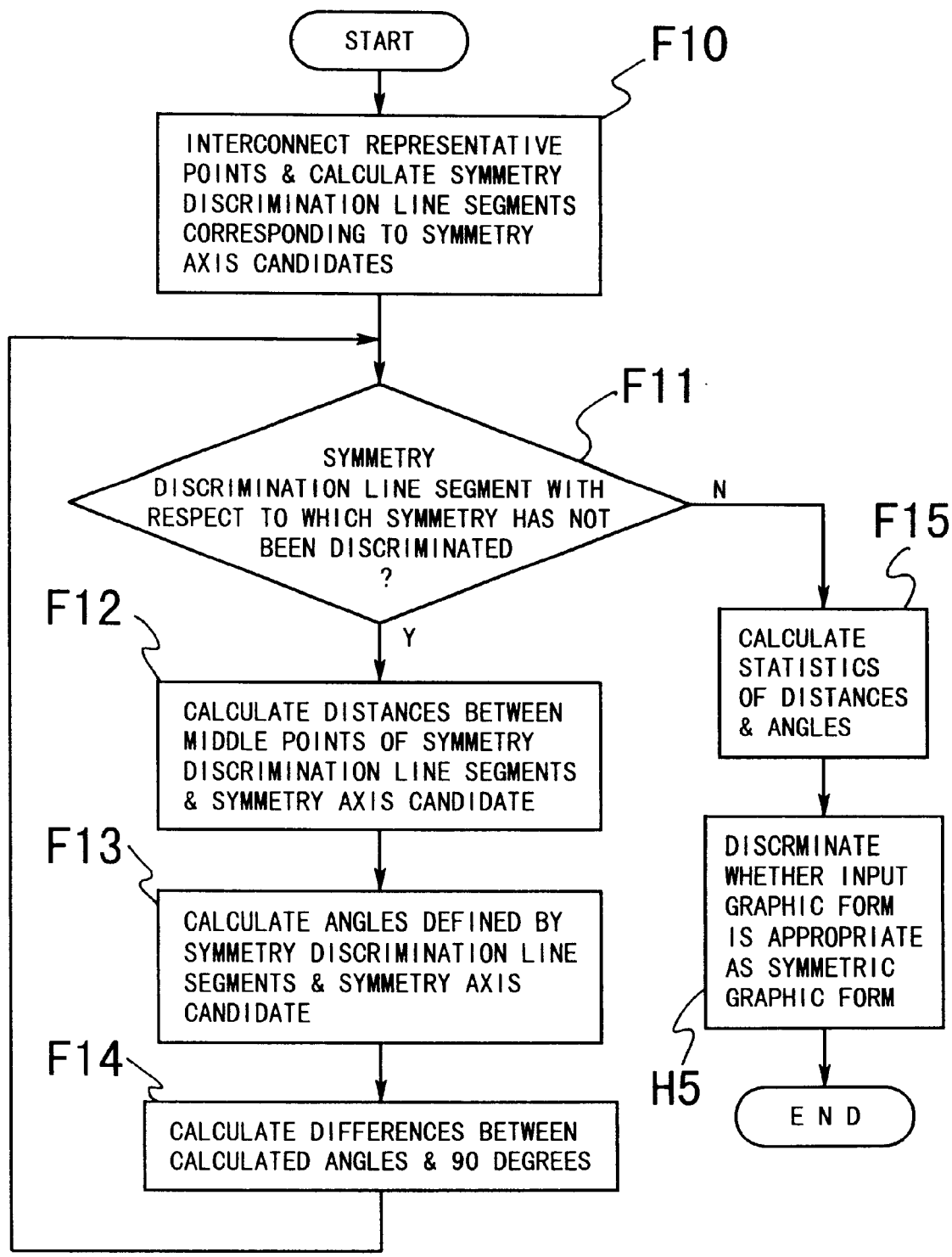
Figure 25:
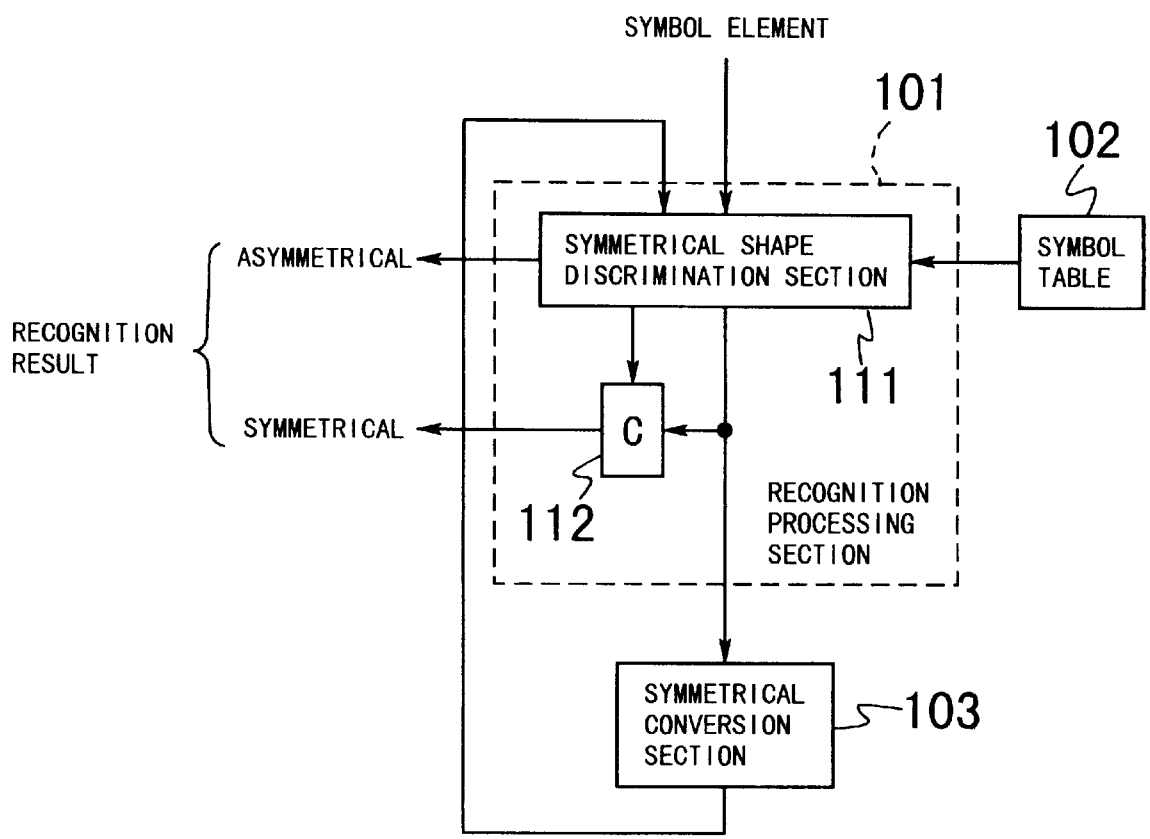
FIG. 25 is a block diagram showing a conventional symbol recognition system.
Figure 26:
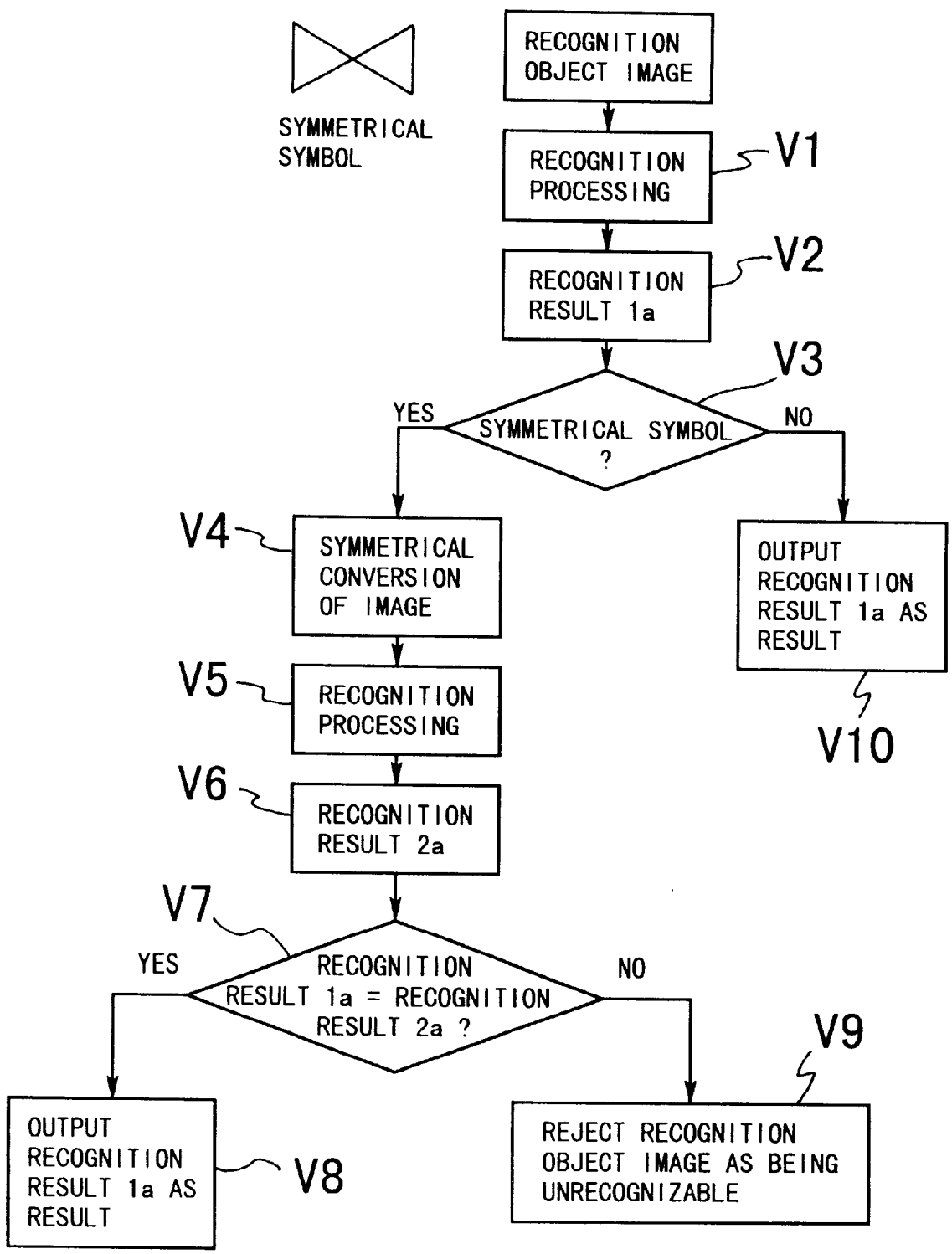
FIG. 26 is a flow chart illustrating a processing procedure of the symbol recognition system shown in FIG. 25.
Figure 27:
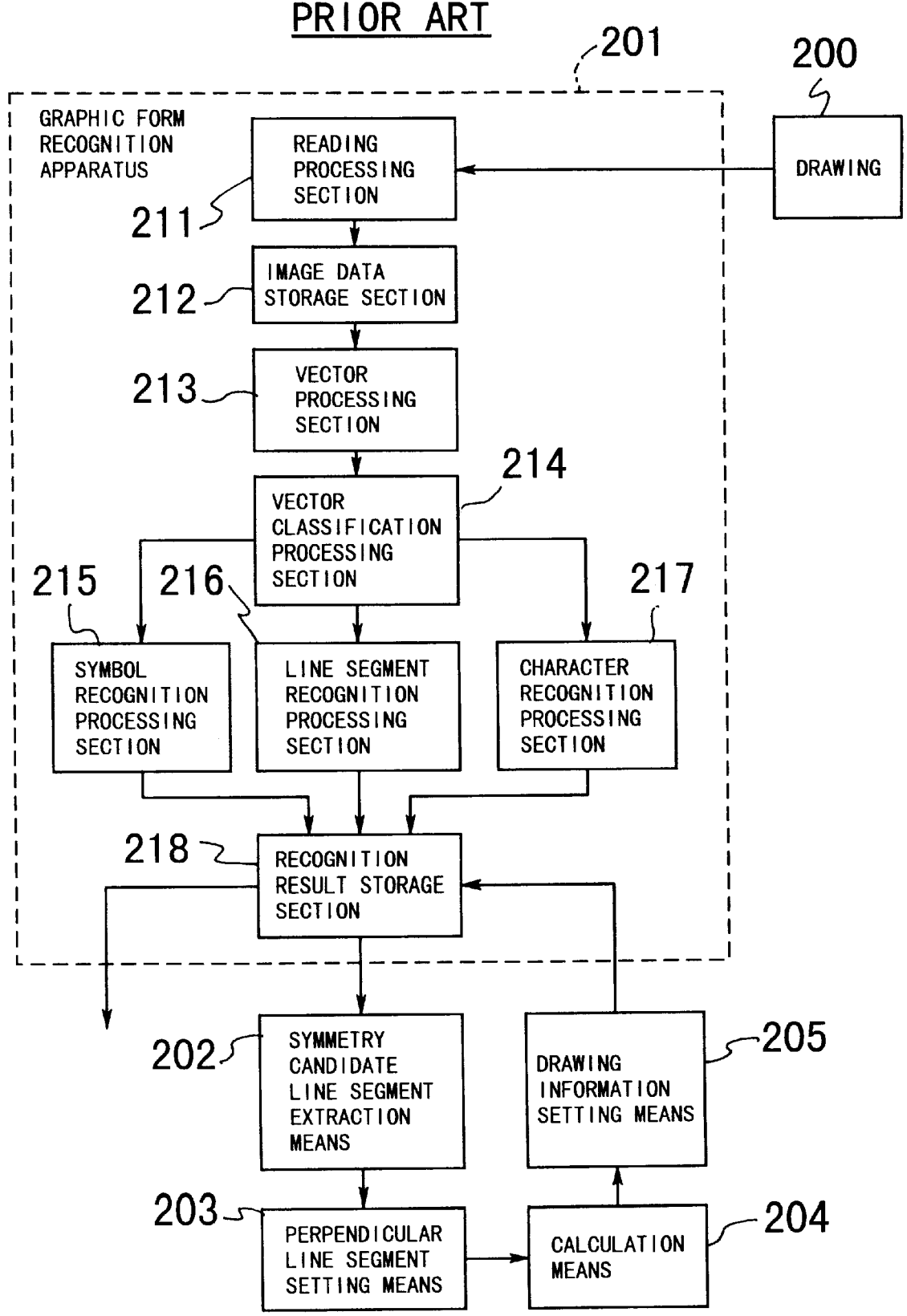
FIG. 27 is a block diagram showing a conventional graphic form symmetry recognition system for a graphic form recognition apparatus.
Figure 28:
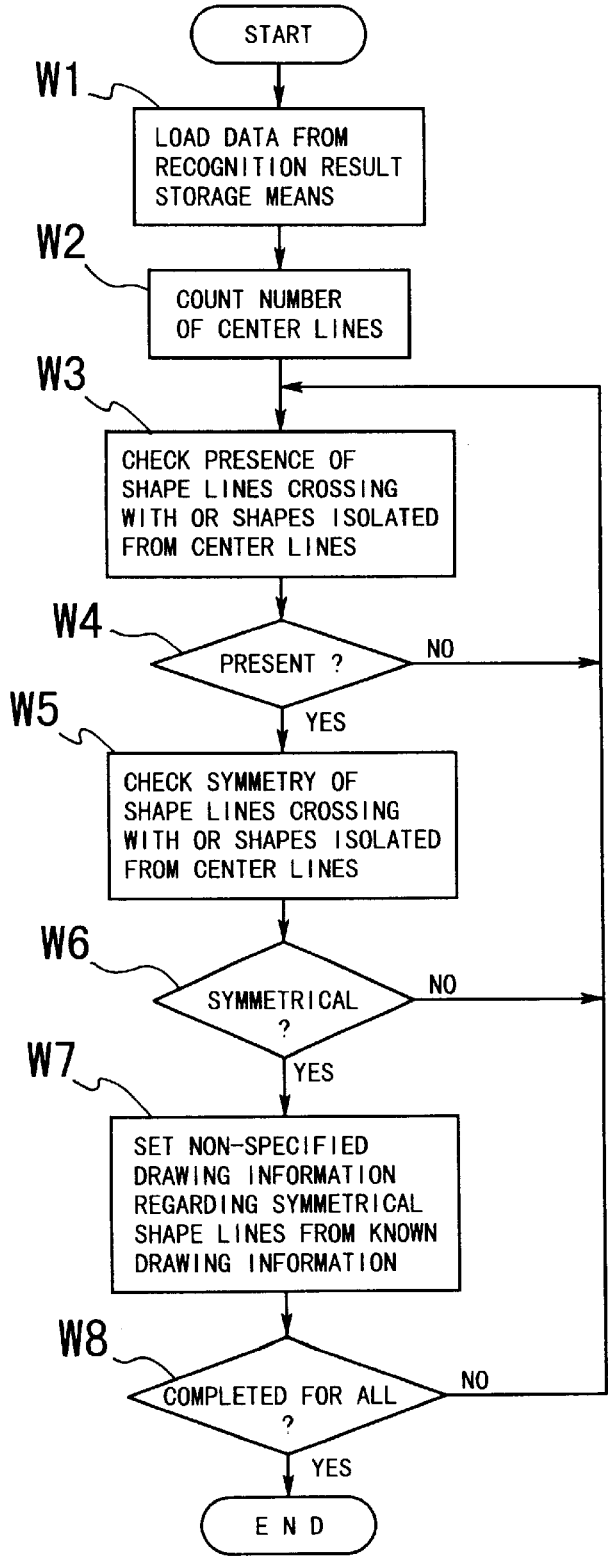
FIG. 28 is a flow chart illustrating a processing procedure of the graphic form symmetry recognition system shown in FIG. 27.
Figure 29:
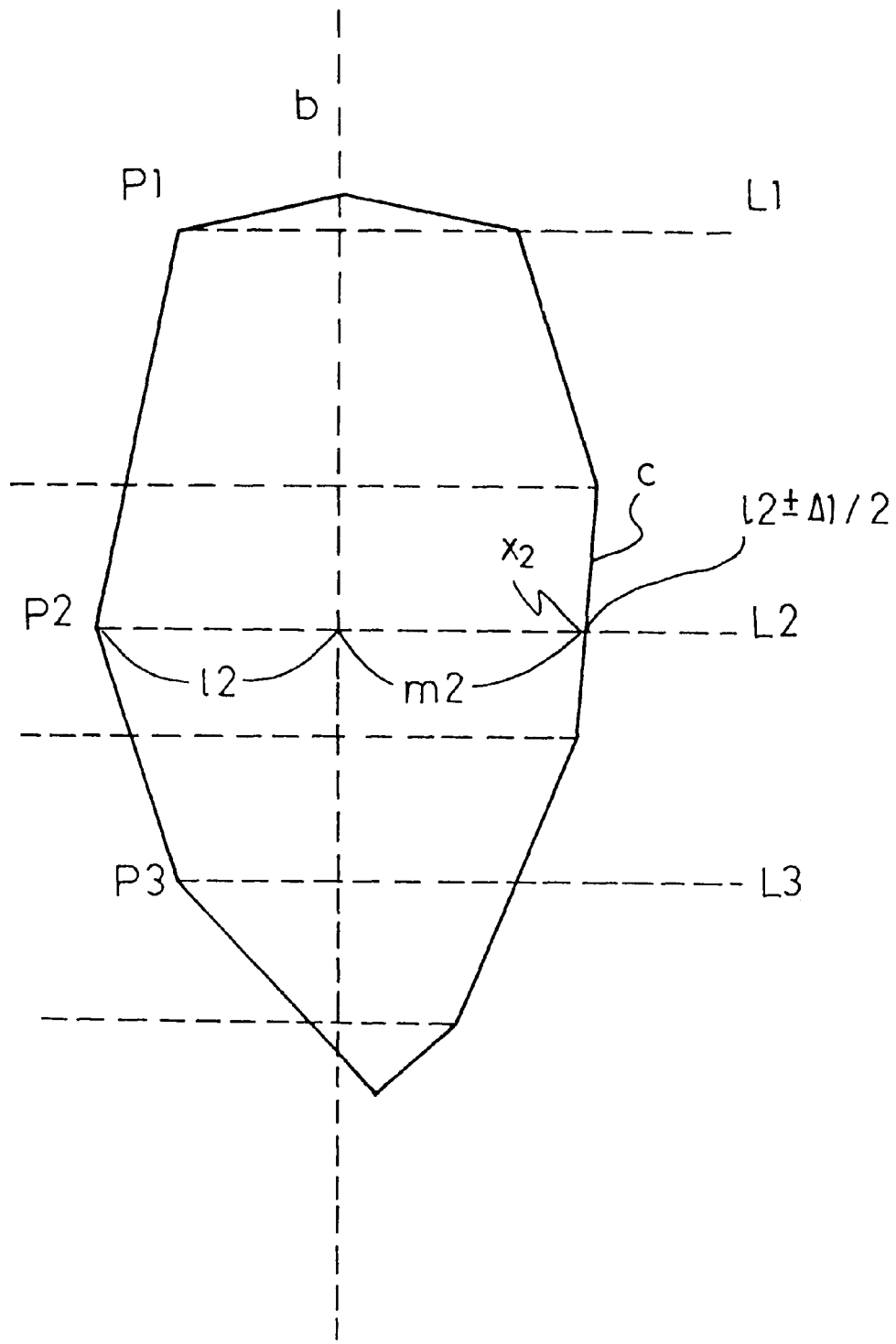
FIG. 29 is a diagrammatic view illustrating a method of discriminating symmetry of a shape line which crosses a center line by the graphic form symmetry recognition system shown in FIG. 27.

Operation of the characteristic point calculation section 20, symmetry axis candidate calculation section 21, curved line approximation section 23, vertical symmetry axis candidate determination section 31, horizontal symmetry axis candidate determination section 32, orthogonal symmetry axis discrimination section 33, first symmetry discrimination line segment calculation section 24, first symmetry axis distance calculation section 25, first symmetry axis angle calculation section 26, second symmetry discrimination line segment calculation section 34, second symmetry axis distance calculation section 35, and second symmetry axis angle calculation section 36 (steps F1 to F7, F8, F9 and F10 to F15 of FIGS. 24(A) and 24(B)) is similar to that of the processing of the graphic form shaping apparatus of FIG. 16 described hereinabove. Accordingly, overlapping description of the operation is omitted here to avoid redundancy.

Appropriateness of a vertical symmetry axis candidate and appropriateness of a horizontal symmetry axis candidate calculated by the first symmetry discrimination section 27 and the second symmetry discrimination section 37, respectively, are stored into the storage apparatus 5 (step H5).

After the appropriateness of both of the symmetry axes as symmetry axes of the input graphic is calculated, the orthogonal axis symmetry shaping processing section 38 performs symmetrical shaping processing with respect to the orthogonal axes if both of the symmetry axes are appropriate as symmetry axes of the input graphic form (step H1).

If one of the symmetry axis candidates is not appropriate, then the one axis symmetry shaping processing section 39 discriminates whether or not either one of the symmetry axis candidates is appropriate as a symmetry axis of the input graphic form (step H2).

If an appropriate symmetry axis is present, then the one axis symmetry shaping processing section 39 performs symmetrical shaping processing with respect to the symmetry axis candidate (step H3).

With the graphic form shaping apparatus of the present embodiment, even if an input graphic form is not symmetrical with respect to both of orthogonal axes, if it is line symmetrical with respect to one of the symmetry axes, then symmetrical shaping processing is performed. Consequently, the possibility that shaping may be performed is increased.

7. Combinations of the Embodiments

If two or more of the additional components in the graphic form shaping apparatus of the second, third and fourth embodiments are combined with the graphic form shaping apparatus of the first embodiment, then composite effects can be achieved.

Similarly, the additional components of the graphic form shaping apparatus of the second and fourth embodiments can be combined with the graphic form shaping apparatus of the fifth or sixth embodiment.

Having now fully described the invention, it will be apparent to one of ordinary skill in the art that many changes and modifications can be made thereto without departing from the spirit and scope of the invention as set forth herein.

What is claimed is:

1. A graphic form shaping apparatus for shaping a graphic form surrounded by a curved line, comprising:

inputting means for inputting an input graphic form;

characteristic point calculation means for calculating characteristic points including apexes and maximal points and minimal points in horizontal and vertical directions of the input graphic form;

curved line approximation means for calculating representative points representative of curved lines of the input graphic form between the characteristic points and approximating the curved lines with approximate curved lines between the characteristic points and the representative points;

symmetry axis candidate calculation means for calculating symmetry axis candidates which are straight lines each interconnecting two opposing ones of the characteristic points;

discrimination symmetry axis determination means for selecting, from among the symmetry axis candidates, a symmetry axis candidate with which symmetry is to be discriminated;

symmetry discrimination line segment calculation means for calculating symmetry discrimination line segments which are line segments each interconnecting two opposing ones of the characteristic points and the representative points with respect to the symmetry axis candidate selected by said discrimination symmetry axis determination means;

symmetry axis distance calculation means for calculating symmetry axis distances which are distances between middle points of the symmetry discrimination line segments and the symmetry axis candidate;

symmetry axis angle calculation means for calculating symmetry axis angles which are magnitudes of differences between angles defined by the symmetry discrimination line segments and the symmetry axis candidate and 90 degrees;

symmetry discrimination means for comparing a set of statistic values of the symmetry axis distances and the symmetry axis angles with respect to the symmetry axis candidate with criteria set in advance to discriminate whether or not the input graphic form is symmetric with respect to the symmetry axis candidate to discriminate whether or not the symmetry axis candidate is a symmetry axis;

symmetrical shaping processing means for moving the characteristic points and the representative points based on the symmetry with respect to the symmetry axis;

storage means for storing the moved characteristic points and representative points; and outputting means for outputting the moved characteristic points and representative points.

2. A graphic form shaping apparatus as claimed in claim 1, further comprising discrimination line segment appropriateness discrimination means for comparing the symmetry axis distance and the symmetry axis angle with regard to one of the symmetry discrimination line segments with criteria determined in advance and discriminating that the symmetry axis candidate is not a symmetry axis when the symmetry axis distance and the symmetry axis angle do not satisfy the criteria.

3. A graphic form shaping apparatus as claimed in claim 1, further comprising shaping symmetry axis determination means for determining, when both of vertical and horizontal symmetry axis candidates are symmetry axes, the symmetry axis to be used by said symmetrical shaping processing means.

4. A graphic form shaping apparatus as claimed in claim 3, wherein said shaping symmetry axis determination means determines the symmetry axis to be used by said symmetrical shaping processing means in accordance with a choice of a user of said graphic form shaping apparatus.

5. A graphic form shaping apparatus as claimed in claim 3, wherein said shaping symmetry axis determination means compares sets of statistic values of the symmetry axis distances and the symmetry axis angles of the symmetry axes with each other and determines one of the symmetry axes which exhibits the highest symmetry as the symmetry axis to be used by said symmetrical shaping processing means.

6. A graphic form shaping apparatus as claimed in claim 1, further comprising shaping reference indication means for allowing a user of said graphic form shaping apparatus to refer to and indicate a reference point for determination of positions of the symmetry axes and the characteristic points and representative points.

7. A graphic form shaping apparatus as claimed in claim 1, wherein the statistic values are means.

8. A graphic form shaping apparatus as claimed in claim 1, wherein the statistic values are variances.

9. A graphic form shaping apparatus as claimed in claim 1, wherein said discrimination symmetry axis determination means selects, from among the symmetry axis candidates calculated by said symmetry axis candidate calculation means, a vertical symmetry axis candidate which is that one of the symmetry axis candidates which is most vertical with respect to a reference horizontal line determined in advance and a horizontal symmetry axis candidate which is that one of the symmetry axis candidates which is most horizontal with respect to the reference horizontal line.

10. A graphic form shaping apparatus as claimed in claim 9, wherein said symmetrical shaping processing means corrects the symmetry axes so that that one of the symmetry axes which is one of the vertical symmetry axis candidates is vertical with respect to the horizontal line and that one of the symmetry axes which is one of the horizontal symmetry axis candidates is horizontal with respect to the horizontal line.

11. A graphic form shaping apparatus as claimed in claim 9, further comprising orthogonal symmetry axis discrimination means for comparing an angle defined by the vertical symmetry axis candidate and the horizontal symmetry axis candidate with a reference value determined in advance to discriminate whether or not the vertical symmetry axis candidate and the horizontal symmetry axis candidate extend perpendicularly to each other, said symmetrical shaping processing means being formed as orthogonal axis symmetrical shaping processing means which corrects the symmetry axes so that that one of the symmetry axes which is one of the vertical symmetry axis candidates is vertical with respect to the horizontal line and that one of the symmetry axes which is one of the horizontal symmetry axis candidates is horizontal with respect to the horizontal line and moves the characteristic points and the representative points based on the symmetry with respect to both of the symmetry axes.

12. A graphic form shaping apparatus as claimed in claim 11, further comprising one axis symmetrical shaping processing means for correcting either one of the symmetry axes which are ones of the vertical symmetry axis candidates and the horizontal symmetry axis candidates with respect to the horizontal line and moving the characteristic points and the representative points based on the symmetry with respect to the one symmetry axis.

13. A graphic form shaping method for shaping a graphic form surrounded by a curved line, comprising the steps of:

calculating characteristic points including apexes and maximal points and minimal points in horizontal and vertical directions of an input graphic form;

calculating representative points on curved lines of the input graphic form between the characteristic points and approximating curved lines between the characteristic points and the representative points with approximated curved lines;

determining one of a most-vertical and a most-horizontal symmetric axis candidate from among straight lines that interconnect pairs of the characteristic points;

calculating symmetry discrimination lines by interconnecting two opposing ones of the characteristic points and the representative points with respect to the symmetric axis candidate;

determining whether each symmetry discrimination line is symmetrical with the symmetric axis candidate; and moving positions of the characteristic points and the representative points based on the symmetry with respect to the symmetric axis candidate and interconnecting the moved characteristic points and representative points with approximate curved lines.

* * * * *